US010785377B2

(12) United States Patent
Takenaka

(10) Patent No.: US 10,785,377 B2
(45) Date of Patent: Sep. 22, 2020

(54) COMMUNICATION SYSTEM, IMAGE FORMING APPARATUS, COMMUNICATION METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Shuichi Takenaka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/360,459

(22) Filed: Mar. 21, 2019

(65) Prior Publication Data

US 2019/0306336 A1 Oct. 3, 2019

(30) Foreign Application Priority Data

Mar. 27, 2018 (JP) ................. 2018-060739

(51) Int. Cl.
| | |
|---|---|
| *H04N 1/00* | (2006.01) |
| *H04W 48/02* | (2009.01) |
| *H04W 4/80* | (2018.01) |
| *G06K 7/14* | (2006.01) |
| *G06K 19/06* | (2006.01) |
| *H04W 84/12* | (2009.01) |

(52) U.S. Cl.
CPC ....... *H04N 1/00315* (2013.01); *G06K 7/1417* (2013.01); *G06K 19/06037* (2013.01); *H04W 4/80* (2018.02); *H04W 48/02* (2013.01); *H04W 84/12* (2013.01)

(58) Field of Classification Search
CPC .... H04N 1/00315; H04W 4/80; H04W 48/02; H04W 84/12; G06K 7/1417; G06K 19/06037

USPC ......................................................... 358/1.15
See application file for complete search history.

(56) References Cited

U.S. PATENT DOCUMENTS

| 10,429,869 | B2* | 10/2019 | Davis | G05F 1/66 |
|---|---|---|---|---|
| 2010/0259549 | A1* | 10/2010 | Brown | G06F 21/36 |
| | | | | 345/589 |
| 2013/0163442 | A1* | 6/2013 | Livingston | H04W 48/16 |
| | | | | 370/252 |
| 2013/0342869 | A1* | 12/2013 | Sako | G06K 15/40 |
| | | | | 358/1.15 |

(Continued)

FOREIGN PATENT DOCUMENTS

JP 2015-216568 A 12/2015

OTHER PUBLICATIONS

Copending, unpublished, U.S. Appl. No. 16/357,590, to Shuichi Takenaka, filed Mar. 19, 2019.

*Primary Examiner* — Allen H Nguyen
(74) *Attorney, Agent, or Firm* — Venable LLP

(57) ABSTRACT

Restriction processing for restricting communication with the network is executed, and a screen for starting establishment of a connection relationship in a state in which the restriction processing is executed is displayed on a display device. A connection relationship with a mobile terminal is established without intervention of the access point of the external apparatus using a wireless LAN interface capable of performing wireless communication, and predetermined information is acquired from the mobile terminal via the wireless LAN interface after establishment of the connection relationship.

16 Claims, 17 Drawing Sheets

(56) References Cited

U.S. PATENT DOCUMENTS

| | | | |
|---|---|---|---|
| 2014/0031078 A1* | 1/2014 | Nishikawa | H04W 40/24 |
| | | | 455/552.1 |
| 2014/0342670 A1* | 11/2014 | Kang | H04L 69/14 |
| | | | 455/41.2 |
| 2016/0299725 A1* | 10/2016 | Hosoda | G06F 3/1236 |
| 2017/0013667 A1* | 1/2017 | Yang | H04W 76/20 |
| 2017/0318325 A1* | 11/2017 | Ortiz | H04N 21/2181 |

* cited by examiner

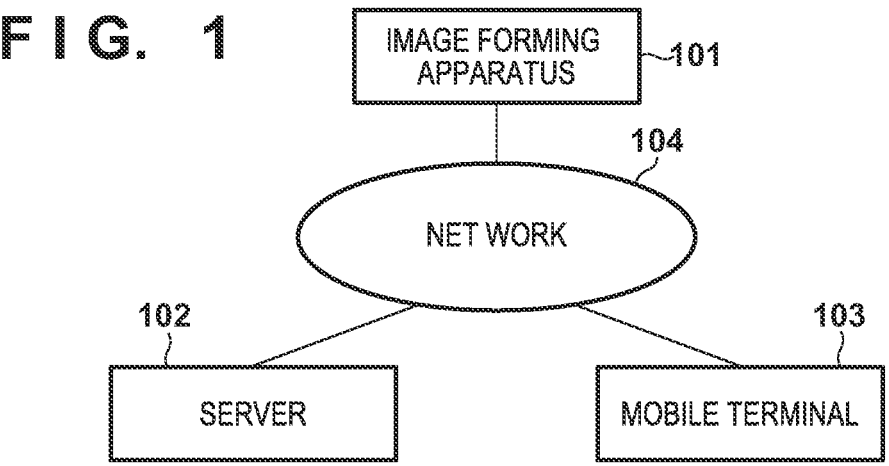
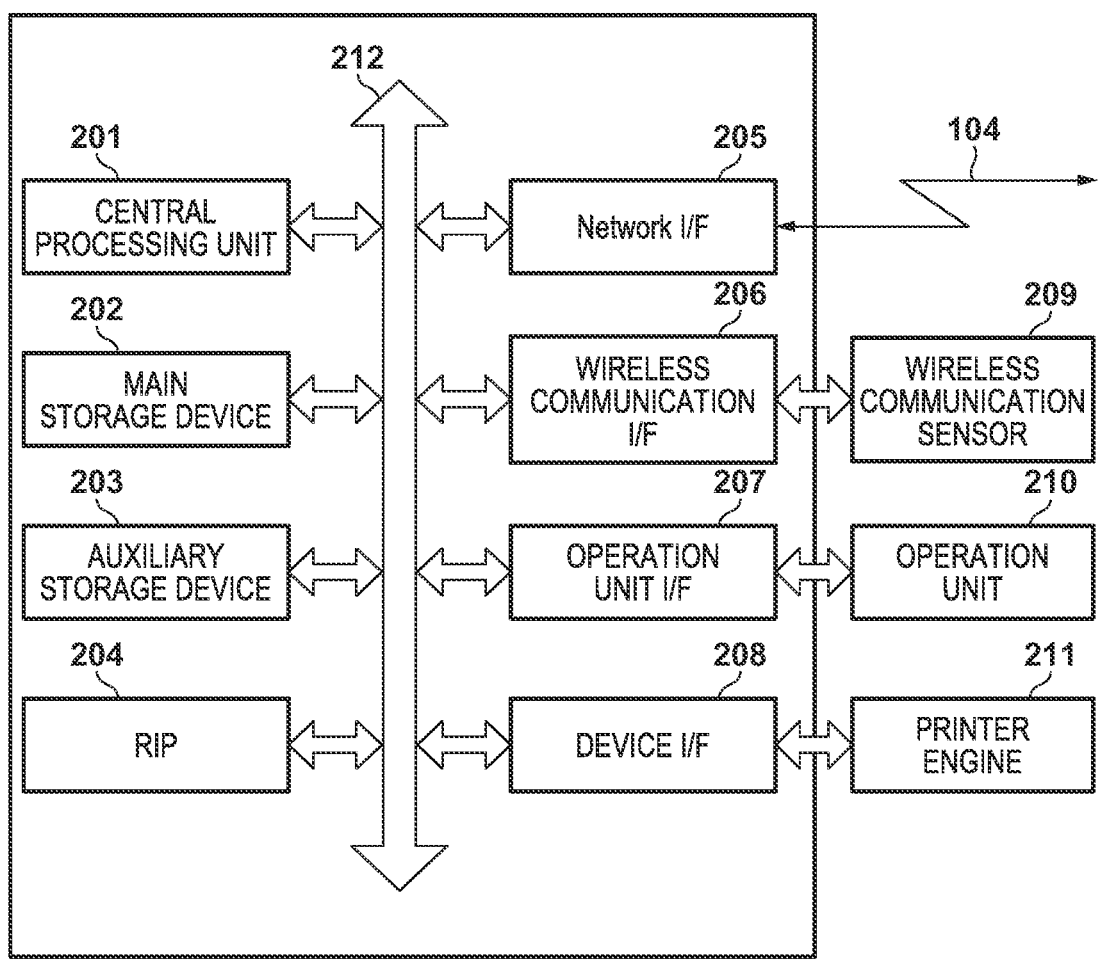

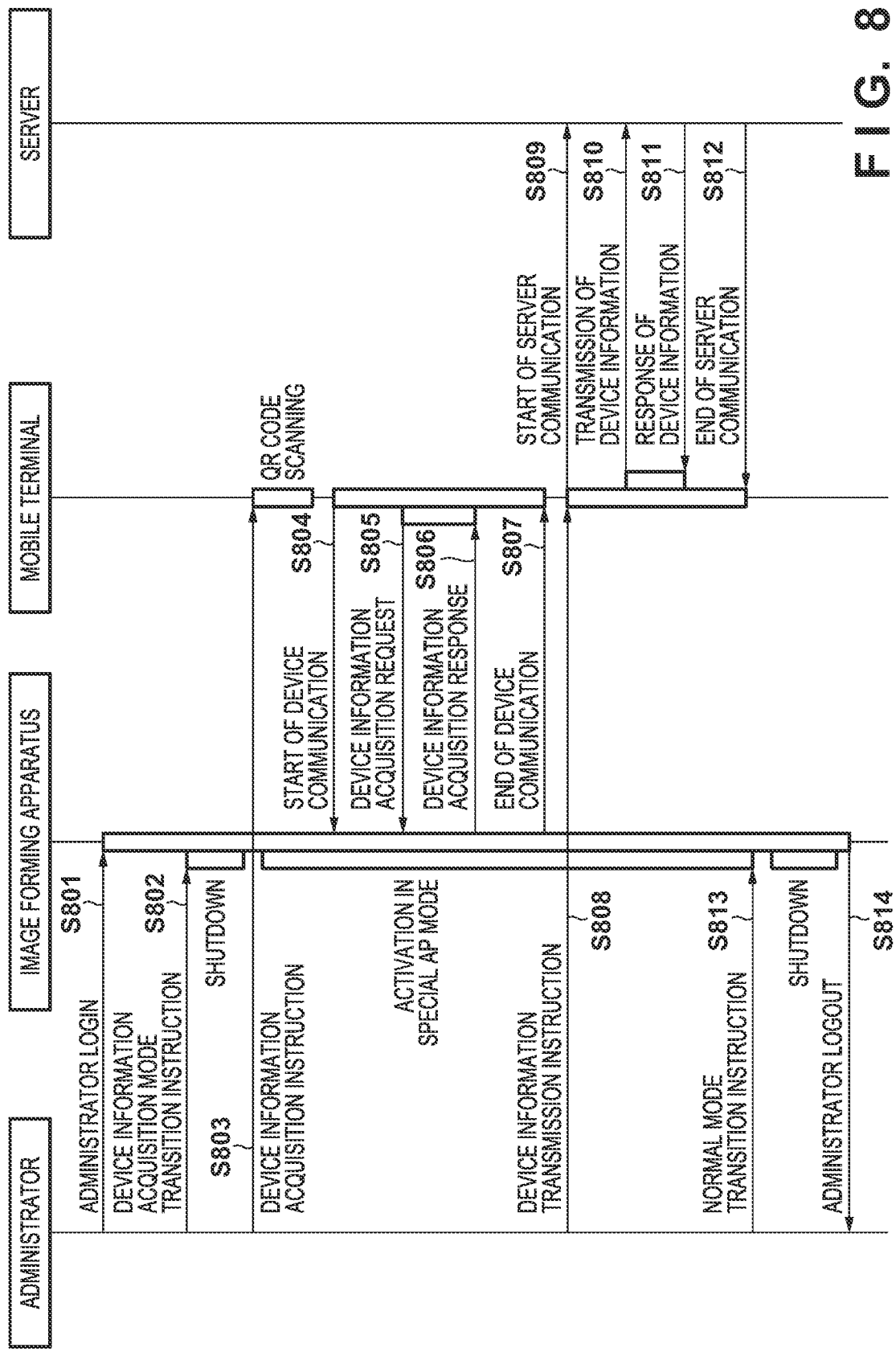

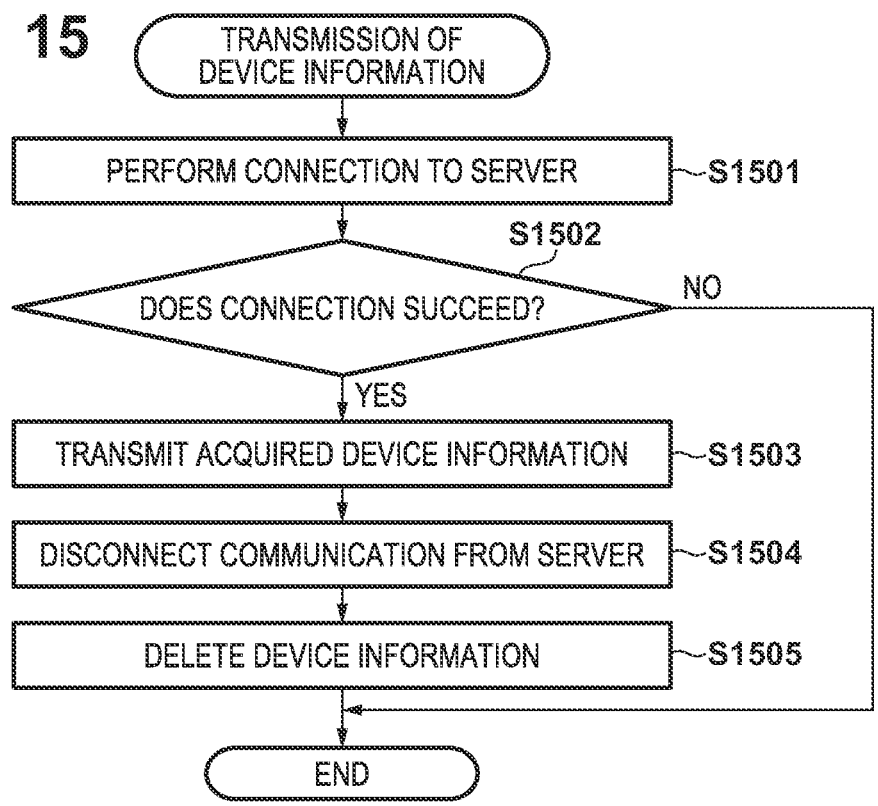
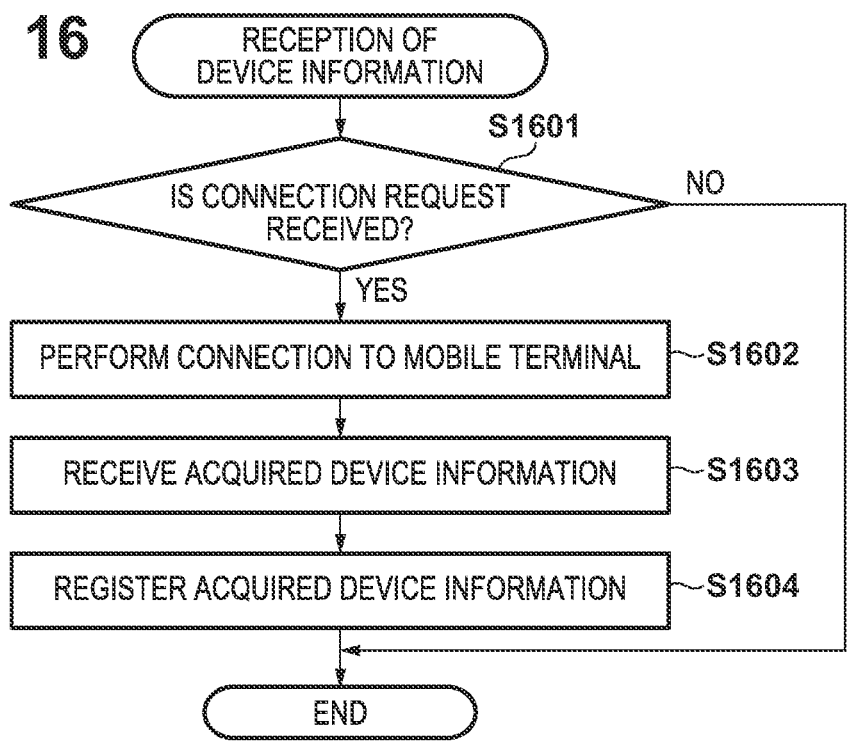

COMMUNICATION SYSTEM, IMAGE FORMING APPARATUS, COMMUNICATION METHOD, AND NON-TRANSITORY COMPUTER-READABLE STORAGE MEDIUM STORING PROGRAM

BACKGROUND OF THE INVENTION

Field of the Invention

The present invention relates to a communication system capable of acquiring device information from an image forming apparatus, the image forming apparatus, a communication method, and a non-transitory computer-readable storage medium storing a program.

Description of the Related Art

In recent years, development and deployment of a technique in which an image forming apparatus and a mobile terminal cooperate with each other have advanced. In addition to a telephone function, email transmission/reception, and connection to the Internet, the mobile terminal can provide various services such as a service for supporting user's health management by communicating/cooperating with peripheral devices selectively using various communication techniques. In communication/cooperation with the image forming apparatus, there are provided a cooperation technique of directly transmitting print data from the mobile terminal to the image forming apparatus or transmitting, to the mobile terminal, a printed material scanned by the image forming apparatus. In addition, there is provided a technique of improving the maintainability of the image forming apparatus. As such technique, Japanese Patent Laid-Open No. 2015-216568 is known.

According to Japanese Patent Laid-Open No. 2015-216568, a mobile terminal and an image forming apparatus perform short-distance wireless communication, thereby transmitting device information in the image forming apparatus at this time to the mobile terminal. The mobile terminal transmits the acquired device information to a maintenance server, and registers it. The maintenance server can analyze failure information and the statuses of the consumable items of the image forming apparatus based on the device information, and notify a serviceman of appropriate maintenance information in accordance with the current status. This allows the serviceman to obtain, in a short time, appropriate information indicating the current status of the image forming apparatus and a maintenance operation to be performed, regardless of the skill of the serviceman, thereby improving the maintainability.

However, according to Japanese Patent Laid-Open No. 2015-216568, when the mobile terminal and the image forming apparatus wirelessly communicate with each other, any user having the mobile terminal can acquire the device information of the image forming apparatus without executing authentication processing specifically. The device information in the image forming apparatus may include confidential information such as various internal logs and various kinds of personal setting information, and the confidential information may leak by analysis. In addition, the device information may be abused to cause a malfunction in a service system by altering the device information and transmitting invalid data to the maintenance server.

SUMMARY OF THE INVENTION

An aspect of the present invention is to eliminate the above-mentioned problems with the conventional technology. The present invention provides a communication system for improving security in transmission/reception of device information of an image forming apparatus, the image forming apparatus, a communication method, and a non-transitory computer-readable storage medium storing a program.

The present invention in one aspect provides an image forming apparatus connectable to a network via an access point of an external apparatus, comprising: a wireless LAN interface configured to perform wireless communication; a display device configured to display information; and at least one controller configured to function as: a unit configured to execute restriction processing for restricting communication with the network; a unit configured to establish a connection relationship with a mobile terminal using the wireless LAN interface without intervention of the access point of the external apparatus; a unit configured to acquire predetermined information from the mobile terminal via the wireless LAN interface after establishment of the connection relationship; and a unit configured to display, on the display device, a screen for starting establishment of the connection relationship in a state in which the restriction processing is executed.

According to the present invention, it is possible to improve security in transmission/reception of device information of an image forming apparatus.

Further features of the present invention will become apparent from the following description of exemplary embodiments with reference to the attached drawings.

BRIEF DESCRIPTION OF THE DRAWINGS

FIG. 1 is a view showing the arrangement of a system;

FIG. 2 is a block diagram showing the arrangement of the hardware blocks of an image forming apparatus;

FIG. 8 is a sequence chart showing a processing sequence among the image forming apparatus, the mobile terminal, and the server;

FIG. 15 is a flowchart illustrating device information transmission processing in the mobile terminal;

FIG. 16 is a flowchart illustrating device information reception processing in the server;

DESCRIPTION OF THE EMBODIMENTS

Figure 3:
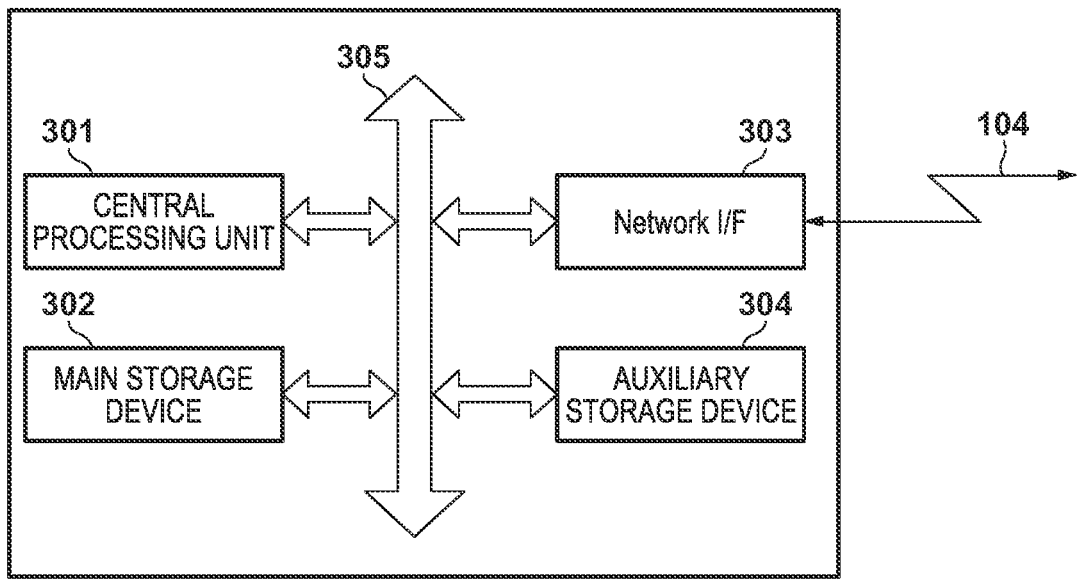
FIG. 3 is a block diagram showing the arrangement of the hardware blocks of a server.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

In recent years, an application operating on a mobile terminal apparatus (a smartphone, a tablet, or the like) (to be simply referred to as a mobile terminal hereinafter) whose functions are increasing is generally distributed using an application distribution service provided by each of the OS vendors of various mobile terminals. Distribution of an application using such application distribution service facilitates obtaining the application. However, as for an application for the purpose of maintenance of an image forming apparatus, if the application is distributed in a state in which anyone can use a function for the administrator, confidential information held in the image forming apparatus may leak.

To solve this problem, in this embodiment, while anyone can obtain an application itself from a distribution service, device information is prevented from being acquired illegally using the application. To achieve this, a dedicated mode (to be referred to as a device information acquisition mode hereinafter) for acquiring the device information from the image forming apparatus is provided in the image forming apparatus. The device information acquisition mode can be shifted to from a menu which can be accessed by only the administrator, and a general user cannot use this mode. In this device information acquisition mode, the image forming apparatus operates in a special communication mode, and operates to accept only communication with a mobile terminal on which a maintenance application is mounted. With this arrangement, after shifting to the device information acquisition mode, a communication request transmitted, to the image forming apparatus, from a mobile terminal using an unauthorized communication application different from the maintenance application can be blocked, thereby preventing the device information data from leaking illegally.

<View of System Arrangement>

An example of the arrangement of a communication system according to this embodiment will be described with reference to FIG. 1. The communication system (to be simply referred to as the system hereinafter) according to this embodiment includes an image forming apparatus 101, a server 102, and a mobile terminal 103. The image forming apparatus 101, the server 102, and the mobile terminal 103 are connected via a network 104.

The image forming apparatus 101 is a multi-function peripheral having various functions such as a scan, FAX, print, and copy functions or a printer having only a print function. The image forming apparatus 101 holds logs obtained when executing various jobs, the consumption counter values of constituent device parts, and an internal log obtained when an error occurs.

The server 102 unitarily manages a plurality of image forming apparatuses installed in respective locations, and analyzes device information of the image forming apparatus 101 transmitted directly from the image forming apparatus 101 via the network 104 or transmitted indirectly via the mobile terminal 103. An analysis result is transmitted to the mobile terminal 103 or the PC of a serviceman in the form of arranged maintenance information, and used to improve the maintainability.

The mobile terminal 103 is a mobile phone, a PDA, or an information processing apparatus such as a multi-function mobile phone (to be referred to as a smartphone hereinafter) or a tablet. In this embodiment, a smartphone will be exemplified but the mobile terminal 103 may be in any form that includes a wireless communication unit capable of acquiring the device information from the image forming apparatus 101, and transmitting it to the server 102. The network 104 is a wireless or wired network formed by a WAN or LAN.

<Hardware Block Diagram of Image Forming Apparatus>

FIG. 2 is a hardware block diagram showing the arrangement of the image forming apparatus 101. Referring to FIG. 2, a central processing unit 201 reads out a program stored in an auxiliary storage device 203 into a main storage device 202, and executes it. Furthermore, the central processing unit 201 comprehensively controls respective devices connected to a system bus 212.

The main storage device 202 functions as the main memory and the work memory of the central processing unit 201. The auxiliary storage device 203 is used for the purpose of holding a large amount of data temporarily or for a long time. The device information according to this embodiment is held in the memory area at a predetermined timing such as the timing of execution of a job, the timing of detection of a change in state of a part, the timing of occurrence of an error, or the timing of reaching a periodic holding schedule time.

A RIP 204 is hardware of rasterizing intermediate print data into a raster image. A network I/F 205 is a wired network unit that is connected to the network 104 and serves to input/output print data and device information to/from a unit external to the printer. When transmitting, to the server 102, the device information held in the auxiliary storage device 203, this is performed from the network I/F 205 at the above-described predetermined timing.

A wireless communication I/F 206 is an interface unit with a wireless communication sensor 209, and plays a role of transmitting, to the central processing unit 201, information transmitted/received to/from the wireless communication sensor 209. The wireless communication sensor 209 transmits/receives data to/from a peripheral device supporting wireless communication using a wireless communication standard such as Wi-Fi. In this embodiment, when transmitting the device information to the mobile terminal 103, the device information is transmitted via the wireless communication sensor 209.

An operation unit I/F 207 is an interface unit with an operation unit 210, and outputs, to the operation unit 210, image data to be displayed on the operation unit 210. The operation unit I/F 207 plays a role of transmitting, to the central processing unit 201, information input by the user of the image forming apparatus 101 from the operation unit 210. The operation unit 210 includes a liquid crystal panel and a sound source as output units, and includes a touch panel, hard keys, and a microphone as input units.

A device I/F 208 sends an image signal, instructs a device operation, or transmits/receives device information based on an instruction from the central processing unit 201. A printer engine 211 is an output device that outputs the image signal onto a print medium, and may adopt an electrophotographic method or an inkjet printing method.

Furthermore, a disk drive for a portable disk recording medium such as a CD or DVD, a memory reader/writer for a portable nonvolatile recording medium such as a flash memory, or the like may be connected to the system bus 212. A program in which processing contents according to this embodiment are written can be saved in the auxiliary storage device 203 via a portable storage medium, and then installed in the image forming apparatus 101.

<Hardware Block Diagram of Server>

FIG. 3 is a hardware block diagram for explaining the arrangement of the server 102. In the server 102, a program in which processing contents according to this embodiment are written is saved in an auxiliary storage device 304 and installed in the server 102. A central processing unit 301 reads out the program stored in the auxiliary storage device 304 into a main storage device 302, and executes it. Furthermore, the central processing unit 301 comprehensively controls respective devices connected to a system bus 305.

The main storage device 302 functions as the main memory and the work memory of the central processing unit 301. A network I/F 303 is connected to the network 104, and used to communicate with a unit external to the server 102. Alternatively, the program can be installed in the auxiliary storage device 304 via the network I/F 303. The device information transmitted from the image forming apparatus 101 or the mobile terminal 103 is received by the network I/F 303, and the result of analyzing the device information by the server 102 is transmitted via the network I/F 303. The auxiliary storage device 304 stores an operating system and the main body of the control program in which the processing contents according to this embodiment are written. The device information of the image forming apparatus 101 according to this embodiment is also held in the memory area.

A disk drive for a portable disk recording medium such as a CD or DVD, a memory reader/writer for a portable nonvolatile recording medium such as a flash memory, or the like may be connected to the system bus 305. The program in which the processing contents according to this embodiment are written can be saved in the auxiliary storage device 304 via a portable storage medium, and then installed in the server 102.

<Hardware Block Diagram of Mobile Terminal>

Figure 4:
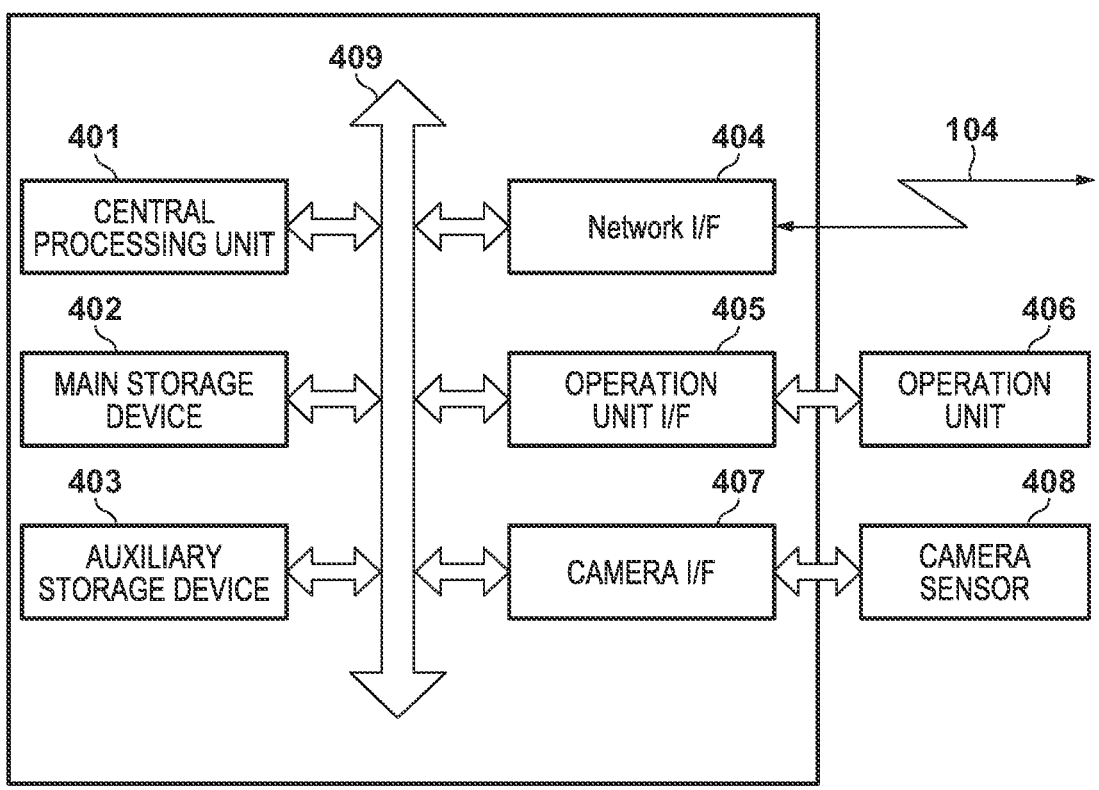
FIG. 4 is a block diagram showing the arrangement of the hardware blocks of a mobile terminal.

FIG. 4 is a hardware block diagram for explaining the arrangement of the mobile terminal 103 according to this embodiment. In the mobile terminal 103, a program in which processing contents according to this embodiment are written is saved in an auxiliary storage device 403 and installed in the mobile terminal 103. A central processing unit 401 reads out the program stored in the auxiliary storage device 403 into a main storage device 402, and executes it. Furthermore, the central processing unit 401 comprehensively controls respective devices connected to a system bus 409.

The main storage device 402 functions as the main memory and the work memory of the central processing unit 401. The auxiliary storage device 403 stores an operating system and the main body of the control program of the mobile terminal 103. The auxiliary storage device 403 is used for the purpose of holding a large amount of data temporarily or for a long time. Therefore, the device information acquired from the image forming apparatus 101 is held in the memory area until transmission to the server 102 is completed or a deletion instruction is received from the user.

A network I/F 404 is connected to the network 104 to be connected to an information terminal external to the mobile terminal 103 via a wireless network, and serves to input/output communication data. Alternatively, it is possible to perform connection to an application distribution service via the network I/F 404, download mobile application data, and then install it in the auxiliary storage device 403.

An operation unit I/F 405 is an interface unit with an operation unit 406, and outputs, to the operation unit 406, image data to be displayed on the operation unit 406. The operation unit I/F 405 plays a role of transmitting, to the central processing unit 401, information input by the user of the mobile terminal 103 from the operation unit 406. The operation unit 406 includes a liquid crystal panel and a sound source as output units, and includes a touch panel, hard keys, and a microphone as input units.

A camera I/F 407 is an interface unit with a camera sensor 408, which operates the camera sensor 408 and acquires image data captured by the camera sensor 408. The camera sensor 408 is a camera mounted on the mobile terminal 103. The camera sensor 408 has not only a function of capturing an image as a camera but also a sensor function of reading information embedded in a two-dimensional code such as a QR Code®. In this embodiment, the camera sensor 408 is used to read a QR code displayed on the operation unit 210 of the image forming apparatus 101, thereby acquiring information necessary for communication.

A disk drive for a portable disk recording medium such as a CD or DVD, a memory reader/writer for a portable nonvolatile recording medium such as a flash memory or micro SD, or the like may be connected to the system bus 409. A program in which processing contents according to this embodiment are written can be saved in the auxiliary storage device 403 via a portable storage medium, and then installed in the mobile terminal 103.

<Software Module Block Diagram of Image Forming Apparatus>

Figure 5:
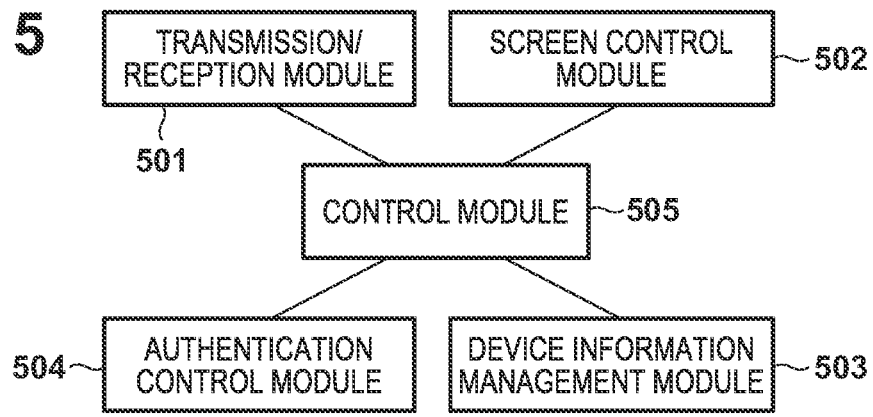
FIG. 5 is a block diagram showing the arrangement of the software modules of the image forming apparatus.

FIG. 5 is a block diagram showing the software module arrangement of the image forming apparatus 101 according to this embodiment. Each software module shown in FIG. 5 is stored as a program in the auxiliary storage device 203, and is loaded into the main storage device 202 and executed by the central processing unit 201.

A transmission/reception module 501 receives print data, transmits scan image, and transmits the device information using the network I/F 205 and the wireless communication sensor 209. A screen control module 502 accepts an operation from the user, and transmits it to a control module 505, thereby instructing execution of the various functions of the image forming apparatus 101.

The screen control module 502 switches the displayed screen between the screen for the administrator and that for the general user based on an authentication result of an authentication control module 504.

A device information management module 503 stores and holds the internal device information in the auxiliary storage device 203 at a predetermined timing such as the timing of execution of a job, the timing of detection of a change in state of a part, the timing of occurrence of an error, or the timing of reaching a periodic holding schedule time.

The authentication control module 504 executes authentication processing based on authentication information received from the screen control module 502 and the transmission/reception module. If, as a result of the authentication processing, the user can be authenticated correctly, he/she is permitted to log in to the image forming apparatus 101 and operate the image forming apparatus 101 as the administrator or the general user. In the third embodiment to be described later, the authentication control module 504 executes authentication processing when transmitting the device information to the mobile terminal 103, and executes, only if authentication succeeds, processing of transmitting the device information. Details of this processing will be described later with reference to FIG. 21. The control module 505 comprehensively controls transmission/reception of various kinds of data, screen control, holding of the device information, the authentication processing, and the like according to this embodiment.

<Software Module Block Diagram of Server>

Figure 6:
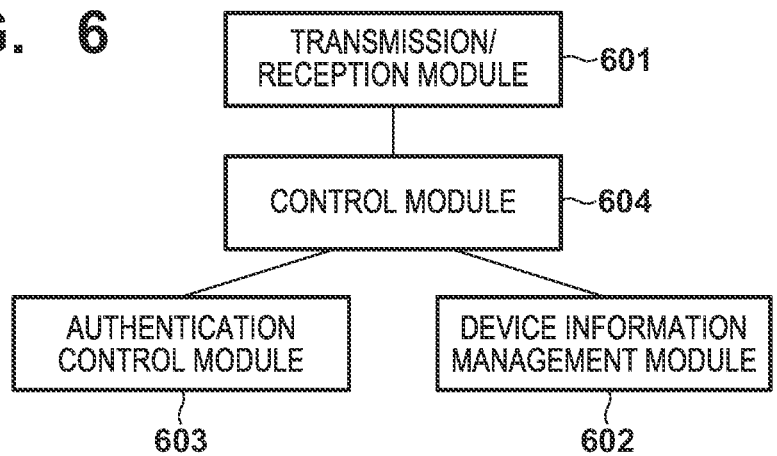
FIG. 6 is a block diagram showing the arrangement of the software modules of the server.

FIG. 6 is a block diagram showing the software module arrangement of the server 102 according to this embodiment. Each software module shown in FIG. 6 is stored as a program in the auxiliary storage device 304, and is loaded into the main storage device 302 and executed by the central processing unit 301.

A transmission/reception module 601 receives the device information transmitted from the image forming apparatus 101 or the mobile terminal 103 via the network I/F 303, and transmits maintenance information as a result of analyzing the device information to the mobile terminal 103, the PC of a serviceman, and the like.

A device information management module 602 manages the pieces of device information from the image forming apparatus 101 and the mobile terminal 103. The device information management module 602 registers and saves the received device information in the auxiliary storage device 304 together with auxiliary information such as a reception date for each image forming apparatus.

An authentication control module 603 executes authentication processing in response to a communication request transmitted from the mobile terminal 103.

Figure 23:
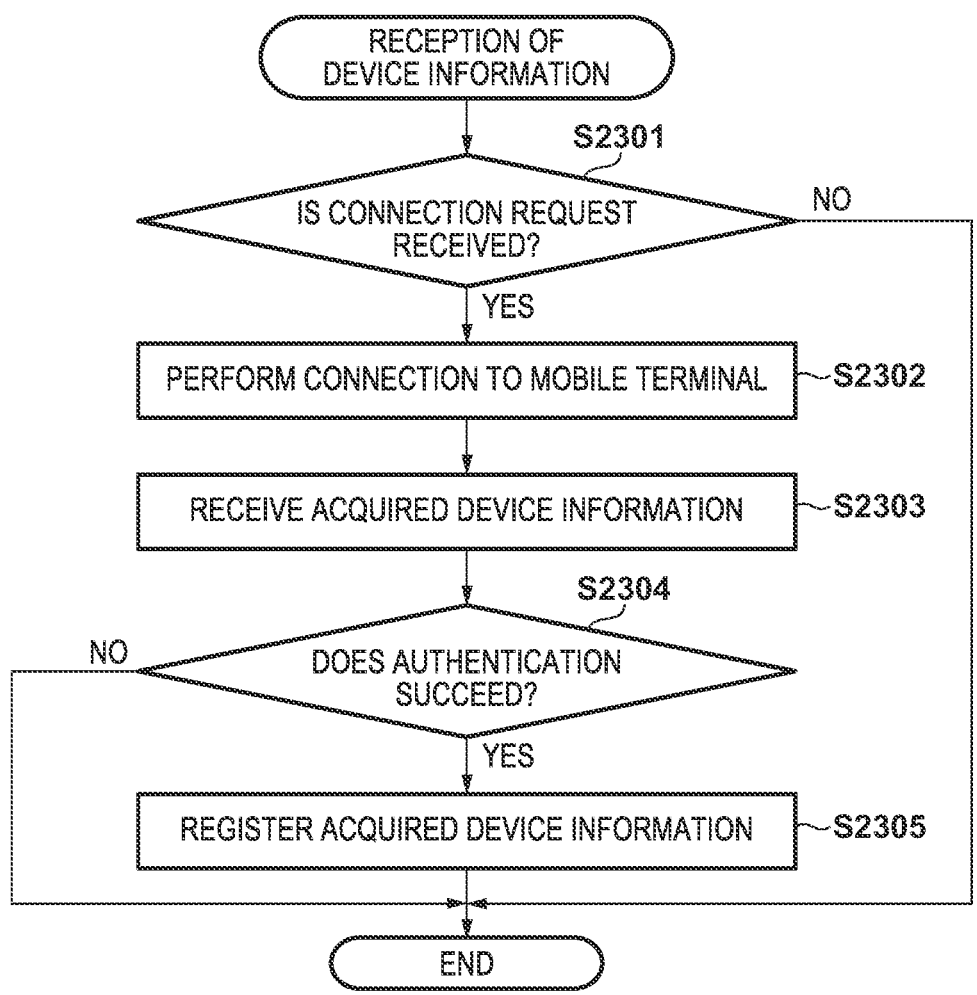
FIG. 23 is a flowchart illustrating device information reception processing in a server.

Details of the authentication processing will be described later with reference to FIG. 23 in the third embodiment. A control module 604 manages general control of transmission/reception of various kinds of data used in this embodiment, saving/management of the device information, and the authentication processing.

<Software Module Block Diagram of Mobile Terminal>

Figure 7:
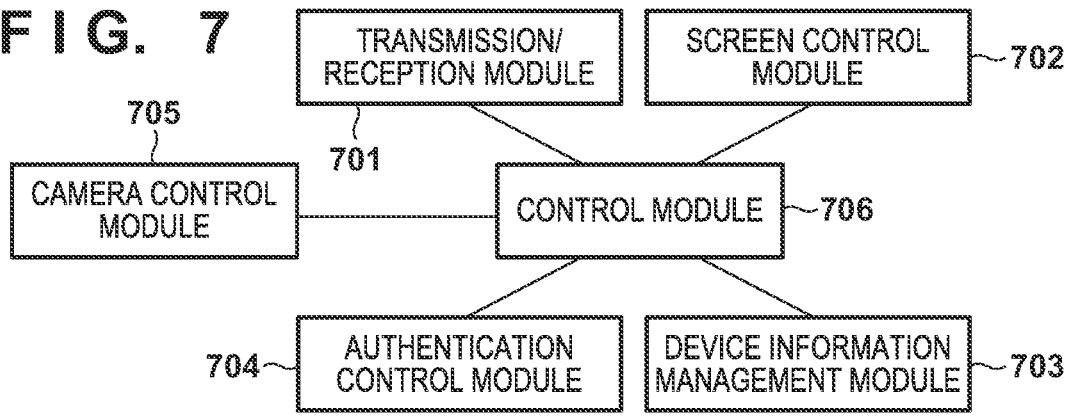
FIG. 7 is a block diagram showing the arrangement of the software modules of the mobile terminal.

FIG. 7 is a block diagram showing the software module arrangement of the mobile terminal 103 according to this embodiment. Each software module shown in FIG. 7 is stored as a program in the auxiliary storage device 403, and is loaded into the main storage device 402 and executed by the central processing unit 401.

A transmission/reception module 701 receives device information from the image forming apparatus 101 using the network I/F 404, and transmits the acquired device information to the server 102. A screen control module 702 accepts an operation from the user, and transmits it to a camera control module 705, thereby instructing execution of the various functions of the mobile terminal 103.

A device information management module 703 manages the device information acquired from the image forming apparatus 101. The device information management module 703 registers and saves the acquired device information in the auxiliary storage device 403 together with auxiliary information such as a reception date for each image forming apparatus.

An authentication control module 704 is used for authentication processing in communication with the image forming apparatus 101 and the server 102. In this embodiment, when communicating with the image forming apparatus 101, the camera control module 705 is used in advance to read a QR code displayed on the operation unit 210 of the image forming apparatus 101 and authentication processing for communication is executed. When acquiring the device information from the image forming apparatus 101 according to this embodiment, the image forming apparatus 101 operates in a special mode. On the other hand, if the image forming apparatus 101 operates in a normal mode, the mobile terminal 103 is controlled not to execute acquisition of the device information. Therefore, to be able to detect that the image forming apparatus 101 operates in the special mode, an identifier for discriminating that the image forming apparatus 101 operates in the special mode is embedded in the QR code displayed on the image forming apparatus 101. The mobile terminal 103 confirms whether the information read from the QR code includes the identifier. Only if the identifier is included, the mobile terminal 103 starts communication with the image forming apparatus 101 to acquire the device information. In the third embodiment, the authentication control module 704 controls to execute the authentication processing when communicating with the image forming apparatus 101 and the server 102, and to transmit/receive data when authentication succeeds. Details of this control processing will be described later with reference to FIG. 22.

The camera control module 705 controls the camera I/F 407 and the camera sensor 408 of the mobile terminal 103 to acquire information necessary for communication with the image forming apparatus 101. A control module 706 manages general control of various processes of transmission/reception of various kinds of data used in this embodiment, screen control, saving/management of the device information, authentication, and camera control.

<Sequence Chart of Processes of Image Forming Apparatus, Mobile Terminal, and Server Apparatus>

FIG. 8 shows the overall sequence of the respective processes of the image forming apparatus 101, the server 102, and the mobile terminal 103 along with instructions from the administrator. The administrator logs in as an administrator to shift the image forming apparatus 101 to the device information acquisition mode (S801 and S802). After that, the mobile terminal 103 acquires the device information of the image forming apparatus 101 (S803 to S807). Then, the mobile terminal 103 transmits the acquired device information to the server 102 (S808 to S812). Lastly, the image forming apparatus 101 returns to the normal mode in accordance with an instruction from the administrator, and the administrator logs out (S813 and S814). This sequence starts from a state in which the image forming apparatus 101 operates after power-on and completion of activation in the normal mode.

In S801, the administrator logs in to the image forming apparatus 101 as an administrator. Upon receiving a login request from the administrator, the image forming apparatus 101 executes the authentication processing. If authentication succeeds, the image forming apparatus 101 gives the operation authority as the administrator, and displays, on the operation unit 210, a menu for using various functions.

Figure 9A:
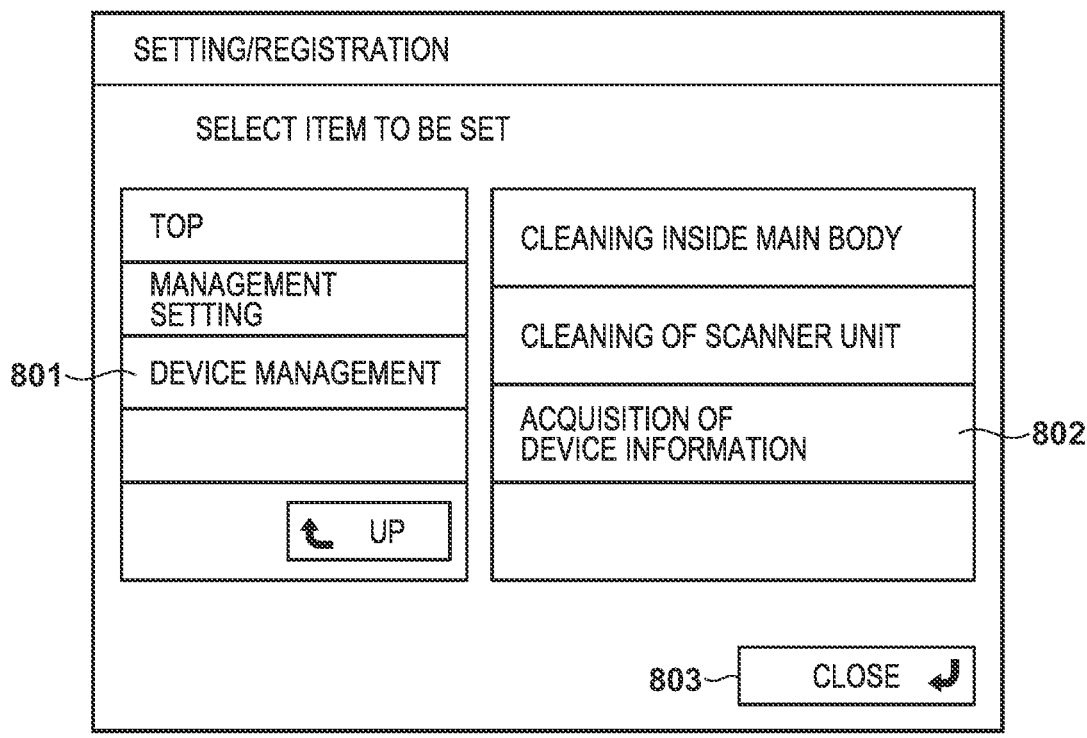
FIGS. 9A and 9B are views each showing the screen of the image forming apparatus.

In S802, with respect to the image forming apparatus 101, the administrator operates a screen shown in FIG. 9A for shifting to the device information acquisition mode, thereby sending an instruction to shift to the device information acquisition mode. Upon receiving the instruction to shift to the device information acquisition mode, the image forming apparatus 101 starts shutdown processing, and is activated in the device information acquisition mode (special AP mode). After completion of activation, the image forming apparatus 101 displays a screen shown in FIG. 10A, and waits for communication with the mobile terminal 103.

In S803, with respect to the mobile terminal 103, the administrator operates an operation screen (not shown) to send a device information acquisition instruction. Upon accepting the device information acquisition instruction, the mobile terminal 103 activates the camera, and starts QR code scanning. If, as a result of QR code scanning, a QR code is detected and acquired communication information includes a mode identifier indicating that the image forming apparatus 101 operates in the device information acquisition mode, the mobile terminal 103 starts communication with the image forming apparatus 101.

In S804, the mobile terminal 103 starts communication with the image forming apparatus 101. In S805, the mobile terminal 103 sends a device information acquisition request to the image forming apparatus 101. In S806, upon receiving the device information acquisition request, the image forming apparatus 101 transmits the internally held device information as a response. In S807, upon receiving all the device information transmitted from the image forming apparatus 101, the mobile terminal 103 automatically disconnects the communication with the image forming apparatus 101.

In S808, the administrator sends, to the mobile terminal 103, an instruction to transmit the device information to the server 102. In S809, the mobile terminal 103 starts communication with the server 102. In S810, upon establishment of communication, the mobile terminal 103 transmits the device information. In S811, upon receiving all the transmitted device information, the server 102 returns a reception completion response.

In S812, the mobile terminal 103 disconnects the communication with the server 102. In S813, the administrator instructs the image forming apparatus 101 to shift to the normal mode. The image forming apparatus 101 executes shutdown processing again, and performs normal activation to return to the normal mode. In S814, the administrator logs out from the image forming apparatus 101, thereby ending the sequence.

With the above processing sequence, processing from acquisition of the device information of the image forming apparatus 101 to transmission of the device information to the server 102 is executed using the mobile terminal 103.

<Administrator Screen of Image Forming Apparatus>

An example of the administrator screen of the image forming apparatus 101 according to this embodiment will be described. In this embodiment, to acquire the device information of the image forming apparatus 101, it is necessary to instruct the image forming apparatus 101 to shift to the device information acquisition mode from the menu that can be accessed by only a user having administrator authority. It is possible to ensure security by restricting a mode transition instruction to the menu that cannot normally be accessed by the user.

FIG. 9A shows a "device management" menu as a part of a menu screen for the administrator. The "device management" menu is one menu of a "management setting" menu that makes it possible to make various maintenance settings of the image forming apparatus 101. When the administrator operates the operation unit of the image forming apparatus 101 to input authentication information such as an ID and a password for the administrator, he/she can obtain the authority to display this screen. A "device management" button 801 is a button for displaying, in a right field, the "device management" menu that makes it possible to instruct cleaning necessary for maintenance of the various image forming apparatuses 101 and the like. When a "device information acquisition" button 802 is selected, the screen transitions to a screen shown in FIG. 9B, thereby making it possible to advance a shift to the device information acquisition mode. This button 802 is grayed out for a user having no administrator authority not to be selected. When a "close" button 803 is selected, control exits from the "device management" menu to return to the "management setting" menu as the menu of the upper layer.

Figure 9B:
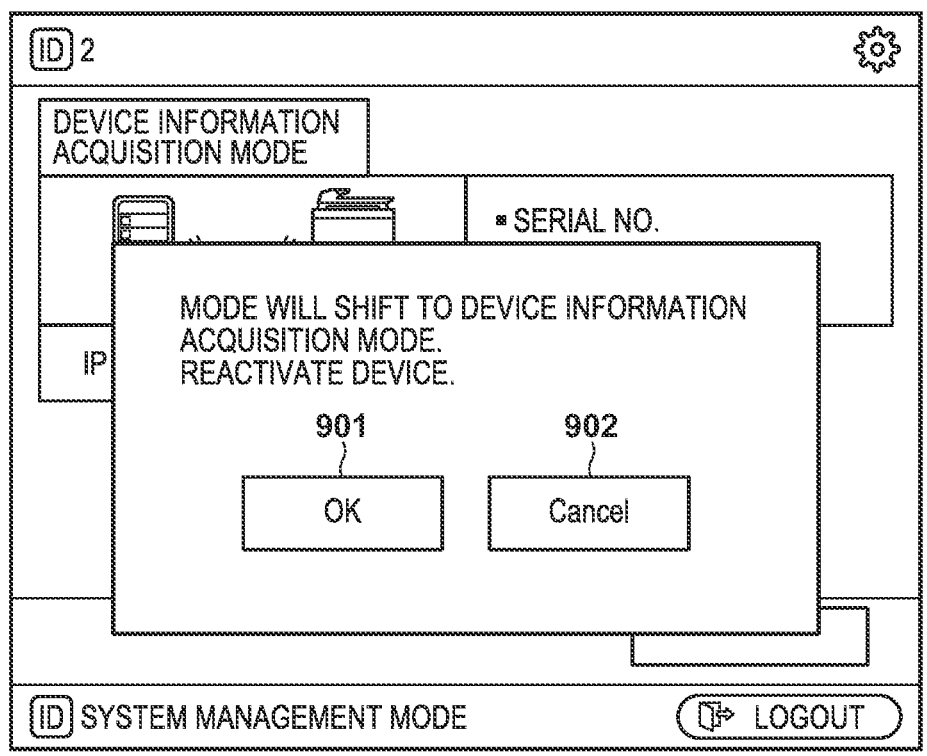

FIG. 9B shows a screen initially displayed when shifting to the device information acquisition mode. Since the device information acquisition mode is a mode of performing an operation in the special communication state, as described above, the image forming apparatus 101 is reactivated once to start in a special operation. When an "OK" button 901 is selected, a reactivation instruction of the image forming apparatus 101 is accepted from the administrator, thereby starting a shift to the device information acquisition mode. When a "Cancel" button 902 is selected, the shift to the device information acquisition mode is canceled, and the screen returns to the screen shown in FIG. 9A.

Figure 10A:
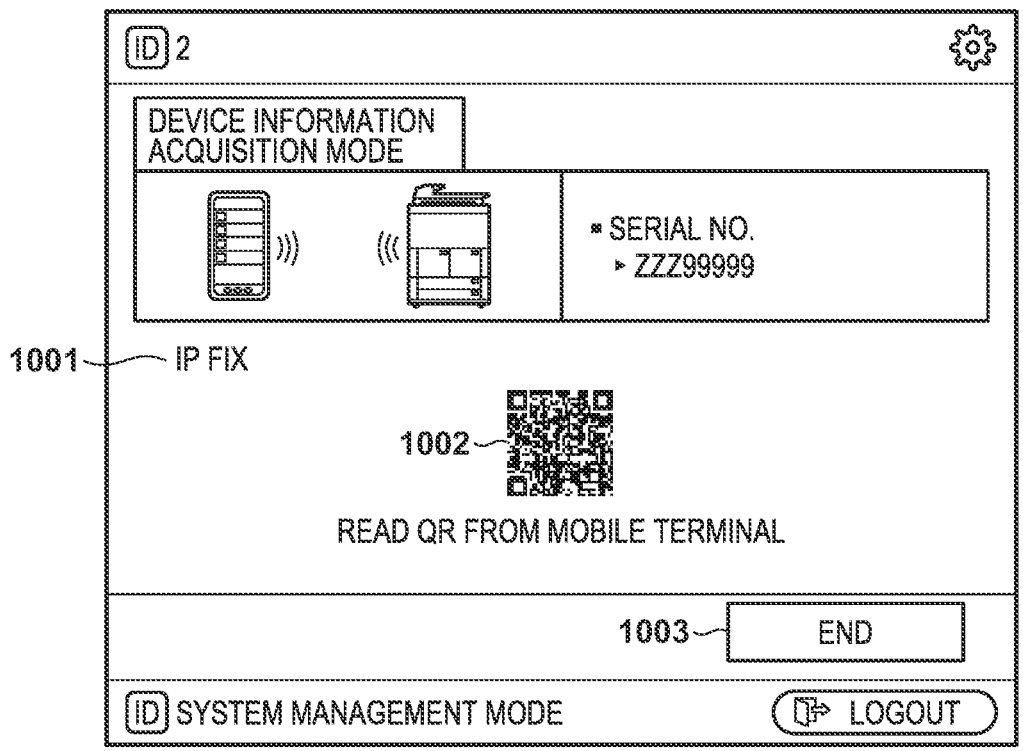
FIGS. 10A and 10B are views each showing the screen of the image forming apparatus.

FIG. 10A shows a screen displayed when the mode shifts to the device information acquisition mode. This screen is a screen displayed after reactivation is instructed by selecting the "OK" button 901 shown in FIG. 9B and activation in the device information acquisition mode is completed. While the image forming apparatus 101 operates in the device information acquisition mode, it operates to accept only communication with the mobile terminal 103 on which the maintenance application is mounted. An "IP FIX" display 1001 is a notification indicating that the apparatus operates in the special mode. By confirming this, the administrator can confirm that the image forming apparatus 101 can shift to the device information acquisition mode correctly. If no "IP FIX" display 1001 is displayed, activation in the device information acquisition mode has failed, and it is thus necessary to redo activation in the device information acquisition mode from the screen shown in FIG. 9A.

Information necessary for the mobile terminal 103 to communicate with the image forming apparatus 101 is embedded in a QR code 1002. While the image forming apparatus 101 operates in the device information acquisition mode, it operates as a special Wi-Fi communication access point (to be referred to as a special AP hereinafter) that accepts only communication with the mobile terminal 103. Therefore, an SSID and passkey as information of the special AP are embedded as communication information in the QR code. At the same time, an identifier indicating that the image forming apparatus 101 operates in the device information acquisition mode is embedded. While the image forming apparatus 101 operates in this mode, it operates with an IP address different from that in the normal mode, and information of this IP address may be embedded to make it possible to notify the mobile terminal 103 of the information. An "end" button 1003 is a button that is selected to end the device information acquisition mode. When the "end" button 1003 is selected, the screen transitions to FIG. 10B.

Figure 10B:
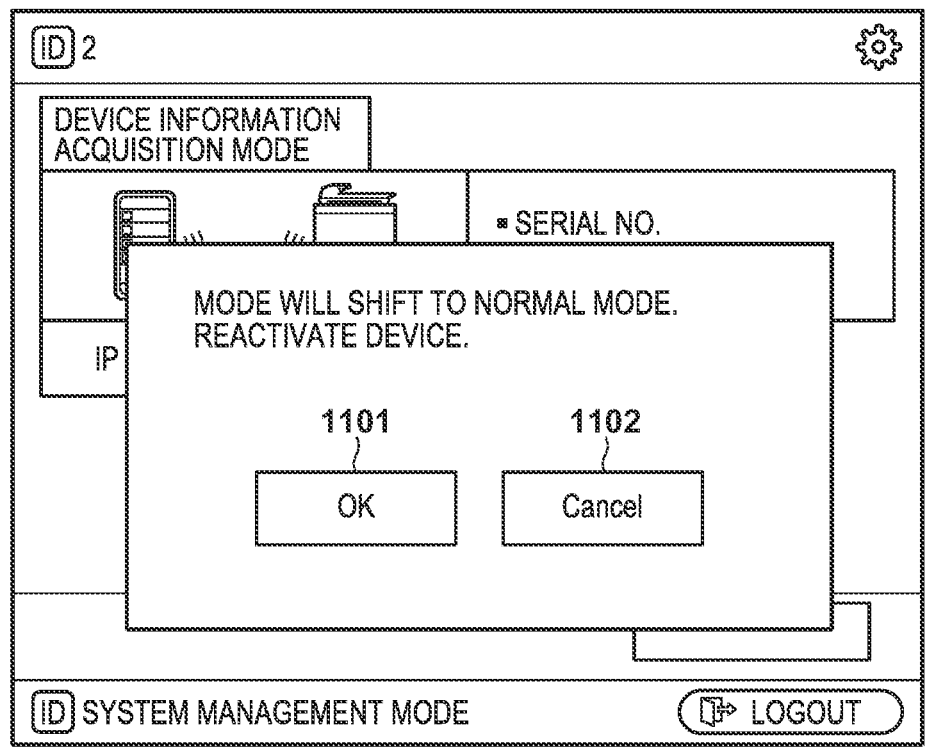

FIG. 10B shows a screen displayed when shifting the image forming apparatus 101 from the device information acquisition mode to the normal mode. When the administrator selects an "OK" button 1101, he/she can return the image forming apparatus 101 to the normal mode. The image forming apparatus 101 performs reactivation to return the operation mode of itself to the normal mode. When a "Cancel" button 1102 is selected, the screen returns to the screen shown in FIG. 10A, and the image forming apparatus 101 continuously operates in the device information acquisition mode.

With the above screen transition and operation procedure, the image forming apparatus 101 can shift from the normal mode to the device information acquisition mode as a special mode, communicate with the mobile terminal 103 to transmit the device information, and return to the normal mode again.

<Procedure of Processing of Shifting to Device Information Acquisition Mode of Image Forming Apparatus>

Figure 11:
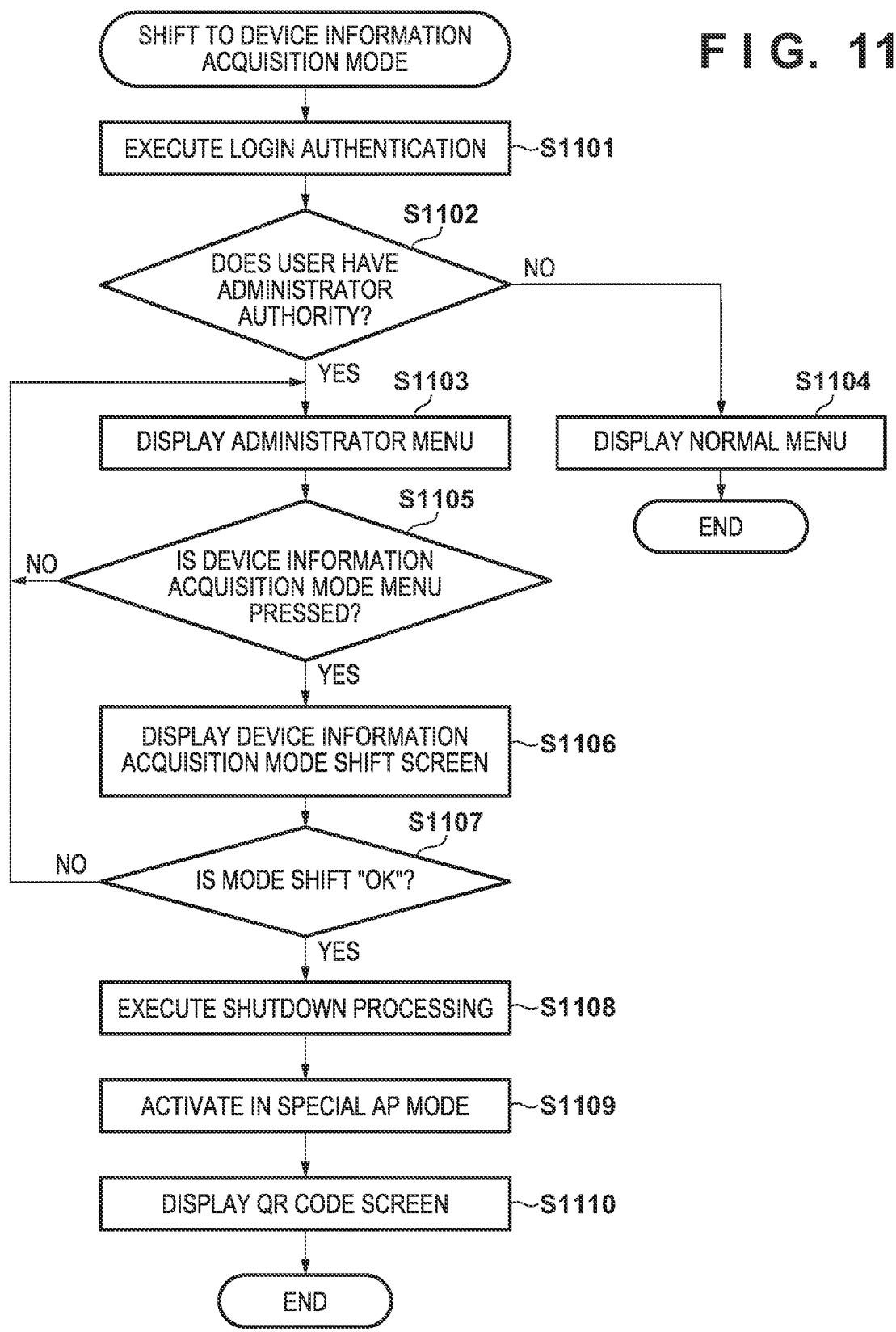
FIG. 11 is a flowchart illustrating processing of shifting to a device information acquisition mode in the image forming apparatus.

Processing of shifting to the device information acquisition mode of the image forming apparatus 101 will be described next with reference to FIG. 11. To acquire the device information of the image forming apparatus 101 using the mobile terminal 103, the administrator of the image forming apparatus 101 needs to shift the image forming apparatus 101 to a mode (device information acquisition mode) for acquiring the device information in accordance with this procedure. In the device information acquisition mode, the image forming apparatus 101 operates as a special Wi-Fi access point, restricts a communication partner so as to enable only communication with the mobile terminal 103, and disables communication with other terminals. When the image forming apparatus 101 transitions to the device information acquisition mode, information (SSID, passkey, mode identifier, IP address, and the like) necessary for the mobile terminal 103 to perform connection to the access point of the image forming apparatus 101 is embedded in a QR code, and the QR code is displayed on the operation unit 210. This procedure corresponds an operation up to processing in which the image forming apparatus 101 transitions to the device information acquisition mode in accordance with the administrator instruction in S801 and S802 in the sequence chart of FIG. 8. Upon detecting that a user is attempting to log in to the image forming apparatus 101, this processing starts.

In step S1101, the central processing unit 201 executes authentication on the login from the user. In step S1102, the central processing unit 201 determines whether the user who is attempting to log in is a user having administrator authority. If the user is a user having administrator authority, the process advances to step S1103; otherwise, the process advances to step S1104.

In step S1103, the central processing unit 201 displays the administrator menu exemplified in FIG. 9A. Note that the administrator menu need not be displayed as an initial screen after the login operation, and may be displayed based on a predetermined operation instruction of the user.

In step S1104, the central processing unit 201 displays a normal menu normally usable by the user. The normal menu indicates the menu of the image forming apparatus 101 except for the menu which can be accessed by only the administrator. The normal menu need not be displayed as an initial screen after the login operation, and may be displayed based on a predetermined operation instruction of the user.

In step S1105, the central processing unit 201 determines whether the "device information acquisition" button 802 shown in FIG. 9A is selected to select a menu for shifting to the device information acquisition mode. If the menu is selected, the process advances to step S1106; otherwise, the process returns to step S1103 to continuously display the administrator menu.

In step S1106, the central processing unit 201 displays the screen, shown in FIG. 9B, displayed when the image forming apparatus 101 shifts to the device information acquisition mode. In step S1107, the central processing unit 201 determines whether the "OK" button 901 shown in FIG. 9B is selected. If the "OK" button 901 is selected, the process advances to step S1108; otherwise, the process returns to step S1103 and the administrator menu continues to be displayed.

In step S1108, the central processing unit 201 executes shutdown processing. In this embodiment, since the image forming apparatus 101 operates in the device information acquisition mode, the shutdown processing is executed in this step. This is done to cause the image forming apparatus 101 to operate as the Wi-Fi communication access point and operate as the special access point that enables only communication with the mobile terminal 103 and disables communication with other terminals. Since the operation as the special access point undergoes communication control exceptional for a normal operation, this may cause an unexpected failure in a communication environment or user settings. To avoid this, the image forming apparatus 101 is shut down once, and processing is performed by separating the activation sequence from the normal sequence of the image forming apparatus 101.

In step S1109, to operate in the device information acquisition mode, the central processing unit 201 performs activation in a state in which the wireless communication I/F 206 and the wireless communication sensor 209 can be used as the special access points. As described above, the operation as the special access point indicates a state in which communication control is performed to enable only communication with the mobile terminal 103 and disable communication with other terminals.

In step S1110, the central processing unit 201 displays, on the operation unit 210, the device information acquisition mode screen including the QR code, as shown in FIG. 10A.

With the above processing, the device information acquisition mode shift processing of the image forming apparatus 101 is executed.

<Procedure of Device Information Acquisition Processing of Mobile Terminal>

Figure 12:
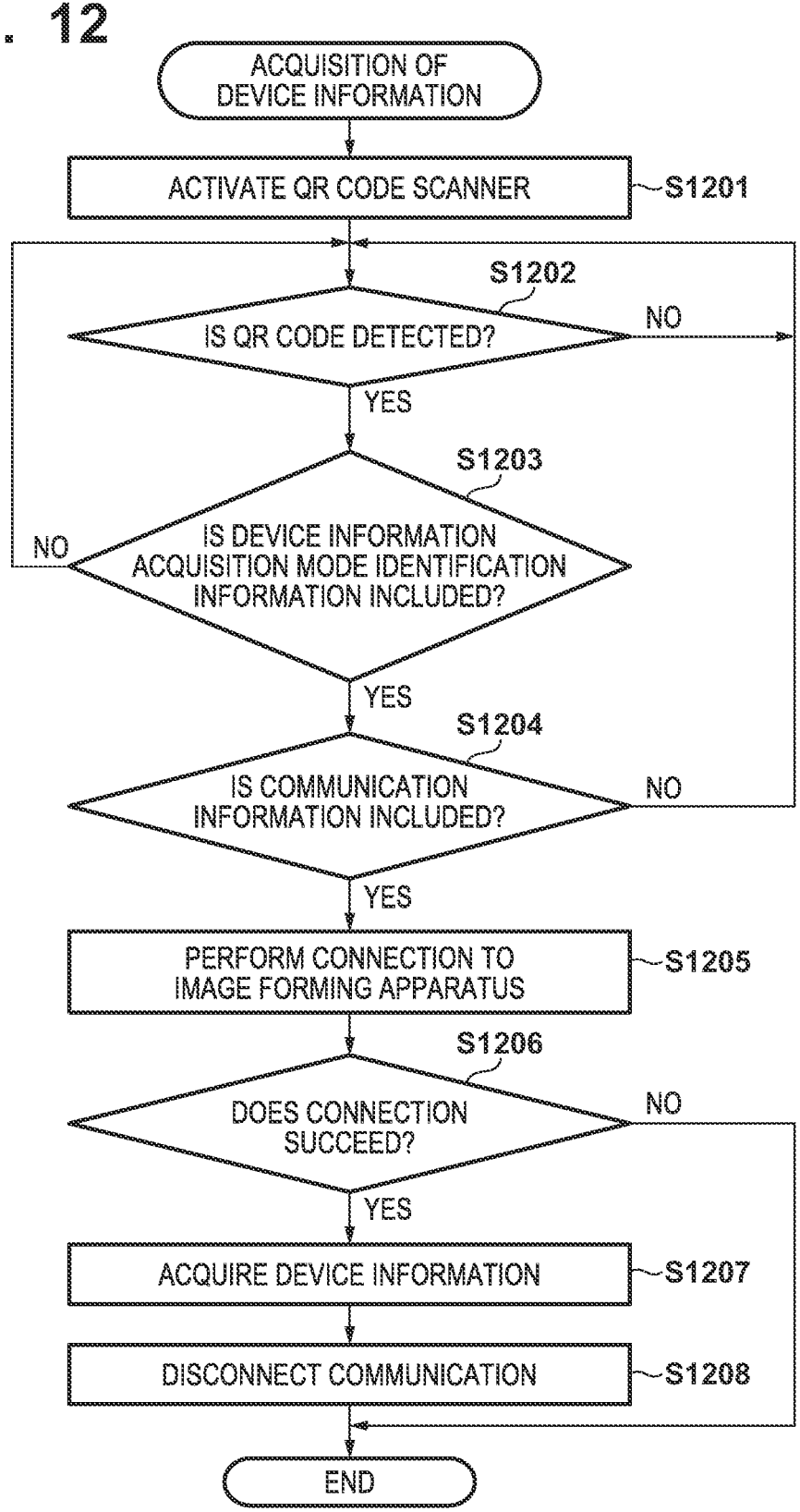
FIG. 12 is a flowchart illustrating device information acquisition processing in the mobile terminal.

The device information acquisition processing of the mobile terminal 103 will be described next with reference to FIG. 12. The mobile terminal 103 acquires the device information of the image forming apparatus 101 by wireless communication. Information necessary for wireless communication with the image forming apparatus 101 is acquired from the QR code displayed on the operation unit 210 while the image forming apparatus 101 operates in the device information acquisition mode. The mobile terminal 103 starts communication processing only if the image forming apparatus 101 operates in the device information acquisition mode when acquiring the device information from the image forming apparatus 101. Therefore, it is determined whether, as a result of reading the QR code, the mode identifier indicating that the image forming apparatus 101 operates in the device information acquisition mode can be acquired. If the mode identifier can be acquired and all the information necessary for communication can be read, the mobile terminal 103 starts communication with the image forming apparatus 101 to acquire the device information. This procedure corresponds to an operation up to processing in which the mobile terminal 103 communicates with the image forming apparatus 101 to acquire the device information in accordance with the administrator instruction in S803 to S807 in the sequence chart of FIG. 8. When the device information acquisition application is activated on the mobile terminal 103 and acquiring the device information is instructed by the user, this processing starts.

In step S1201, the central processing unit 401 controls the camera I/F 407 to activate a QR code scanner by the camera sensor 408, thereby starting QR code scanning. In step S1202, the central processing unit 401 determines whether a QR code is detected by QR code scanning. If a QR code is detected, the process advances to step S1203; otherwise, the process returns to step S1202 to repeat the QR code scanning processing.

In step S1203, the central processing unit 401 determines whether information embedded in the QR code includes the mode identifier indicating that the image forming apparatus 101 operates in the device information acquisition mode. If the mode identifier is included, the process advances to step S1204; otherwise, the process returns to step S1202 to repeat the QR code scanning processing.

In step S1204, the central processing unit 401 determines whether the information embedded in the QR code includes information (SSID, passkey, mode identifier, IP address, and the like) necessary for communication with the image forming apparatus 101. If the information is included, the process advances to step S1205; otherwise, the process returns to step S1202 to repeat the QR code scanning processing.

In step S1205, the central processing unit 401 starts communication with the image forming apparatus 101. In step S1206, the central processing unit 401 determines whether communication with the image forming apparatus 101 succeeds. If communication succeeds, the process advances to step S1207; otherwise, the process ends.

In step S1207, the central processing unit 401 acquires the device information from the image forming apparatus 101. In step S1208, the central processing unit 401 disconnects the communication with the image forming apparatus 101.

With the above processing, the device information acquisition processing of the mobile terminal 103 is executed.

<Procedure of Device Information Transmission Processing of Image Forming Apparatus>

Figure 13:
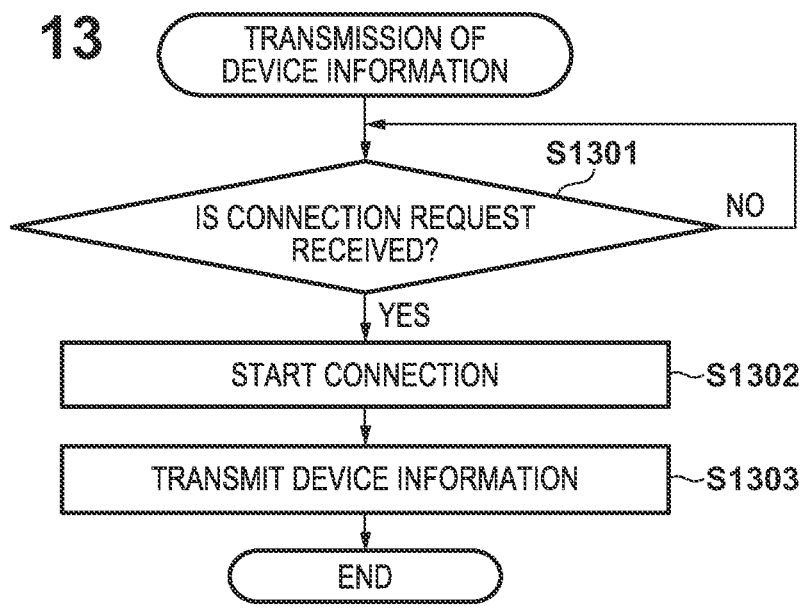
FIG. 13 is a flowchart illustrating device information transmission processing in the image forming apparatus.

The device information transmission processing of the image forming apparatus 101 will be described next with reference to FIG. 13. After shifting to the device information acquisition mode described with reference to FIG. 11, the image forming apparatus 101 waits for reception of a communication request from the mobile terminal 103 or an instruction to end the device information acquisition mode from the administrator while displaying the QR code on the operation unit 210. Upon receiving a communication request from the mobile terminal 103, the image forming apparatus 101 starts communication to transmit the device information. If no communication request is received from the mobile terminal 103 and an instruction to end the device information acquisition mode is received from the administrator, processing of shifting to the normal mode is executed in accordance with a procedure shown in FIG. 14. This processing will be described later. This procedure corresponds to an operation up to processing in which the mobile terminal 103 communicates with the image forming apparatus 101 to acquire the device information in accordance with the administrator instruction in S805 to S807 in the sequence chart of FIG. 8. Upon detecting communication from the mobile terminal 103, this procedure starts.

In step S1301, the central processing unit 201 determines whether a communication request is received from the mobile terminal 103. If a communication request is received from the mobile terminal 103, the process advances to step S1302; otherwise, the processing in step S1301 is repeated to wait for an instruction from the administrator or a communication request from the mobile terminal 103.

In step S1302, the central processing unit 201 starts communication with the mobile terminal 103. In step S1303, the central processing unit 201 transmits the device information of the image forming apparatus 101 to the mobile terminal 103.

With the above processing, the device information transmission processing of the image forming apparatus 101 is executed.

<Procedure of Processing of Shifting to Normal Mode of Image Forming Apparatus>

The processing of shifting to the normal mode of the image forming apparatus 101 will be described next with reference to FIG. 14. After transmitting the device information by communicating with the mobile terminal 103, the image forming apparatus 101 can return to the normal mode by an instruction to end the device information acquisition mode from the administrator in accordance with this procedure. As described above, in the device information acquisition mode, since only communication with the mobile terminal 103 is enabled and communication with other terminals is disabled, a normal job cannot be processed. Therefore, after completion of acquisition of the device information of the image forming apparatus 101, the administrator needs to return the image forming apparatus 101 to the normal mode by operating the device information acquisition mode screen shown in FIG. 10A in accordance with this procedure. Note that at the start of this procedure, the image forming apparatus 101 operates in the device information acquisition mode, and thus the QR code shown in FIG. 10A is kept displayed on the operation unit 210. This procedure corresponds to an operation up to processing in which the image forming apparatus 101 transitions to the normal mode in accordance with the administrator instruction in S813 and S814 in the sequence chart of FIG. 8. Upon detecting an operation of the administrator on the operation unit 210, this procedure starts.

In step S1401, the central processing unit 201 determines whether the administrator selects the "end" button 1003 from the device information acquisition mode screen shown in FIG. 10A to provide an instruction to end the device information acquisition mode. If an end instruction is provided, the process advances to step S1402; otherwise, the process returns to step S1401 to wait for an instruction from the administrator or a communication request from the mobile terminal 103.

In step S1402, the central processing unit 201 displays, on the operation unit 210, a pop-up screen shown in FIG. 10B for making a notification of a shift to the normal mode, thereby notifying the administrator of information indicating whether to shift to the normal mode again.

In step S1403, the central processing unit 201 determines whether the administrator approves a shift to the normal mode in the pop-up screen. If the "OK" button 1101 shown in FIG. 10B is selected to approve a shift to the normal mode, the process advances to step S1404. If the "Cancel"

button 1102 is selected not to approve a shift to the normal mode, the process returns to step S1401 to wait for an instruction from the administrator or a communication request from the mobile terminal 103.

In step S1404, the central processing unit 201 executes shutdown processing. In step S1405, the central processing unit 201 shifts the operation mode of itself from the device information acquisition mode to the normal mode, and performs reactivation.

With the above processing, the processing of shifting to the normal mode of the image forming apparatus 101 is executed.

<Procedure of Device Information Transmission Processing of Mobile Terminal>

The device information transmission processing of the mobile terminal 103 will be described next with reference to FIG. 15. If acquisition of the device information from the image forming apparatus 101 is complete, the mobile terminal 103 transmits the device information to the server 102. This procedure corresponds to an operation up to processing in which the mobile terminal 103 communicates with the server 102 to transmit the device information in accordance with the administrator instruction in S808 to S812 in the sequence chart of FIG. 8. When the user sends a device information operation instruction to the server 102, this procedure starts.

In step S1501, the central processing unit 401 starts communication with the server 102. In step S1502, the central processing unit 401 determines whether communication with the server 102 succeeds. If communication succeeds, the process advances to step S1503; otherwise, the process ends.

In step S1503, the central processing unit 401 transmits the device information to the server 102. In step S1504, the central processing unit 401 disconnects the communication with the server 102. In step S1505, the central processing unit 401 deletes the device information which has been held in the memory area and transmitted to the server 102.

With the above processing, the device information transmission processing of the mobile terminal 103 is executed.

<Procedure of Device Information Reception Processing of Server Apparatus>

The device information reception processing of the server 102 will be described next with reference to FIG. 16. The server 102 receives, via the network 104, the device information acquired by the mobile terminal 103 from the image forming apparatus 101. The received device information is registered and saved in the auxiliary storage device 304 by the device information management module 602 of the server 102. Upon detecting communication from the mobile terminal 103, this procedure starts.

In step S1601, the central processing unit 301 determines whether a connection request is received from the mobile terminal 103. If a connection request is received, the process advances to step S1602; otherwise, the process ends.

In step S1602, the central processing unit 301 is connected to the mobile terminal 103. In step S1603, the central processing unit 301 receives the device information transmitted from the mobile terminal 103. In step S1604, the central processing unit 301 registers and saves the received device information in the auxiliary storage device 304 by the device information management module 602.

With the above processing, the device information reception processing of the server 102 is executed.

As described above, according to this embodiment, even if the application for acquiring the device information of the image forming apparatus 101 is distributed by the distribution service, the maintenance service of high security in which the mobile terminal 103 and the image forming apparatus 101 cooperate with each other can be provided.

Note that in this embodiment, firstly the administrator shifts the image forming apparatus 101 to the device information acquisition mode. After shifting to the device information acquisition mode, the image forming apparatus 101 waits for communication with the mobile terminal 103 while displaying, on the operation screen, a QR code in which information necessary for communication is embedded. The identifier indicating that the image forming apparatus 101 operates in the device information acquisition mode is embedded in the QR code.

If the image forming apparatus 101 operates in the normal mode, the mobile terminal 103 does not acquire the device information, and acquires the information only if the image forming apparatus 101 is in the device information acquisition mode. Therefore, only if the identifier that makes it possible to discriminate that the image forming apparatus 101 operates in the device information acquisition mode is detected in the information acquired from the image forming apparatus 101 by reading the QR code using the camera function, the mobile terminal 103 shifts to processing of acquiring the device information. If there is no identifier indicating that the image forming apparatus 101 operates in the device information acquisition mode, for example, if another QR code used by another function or the like is read, the mobile terminal 103 does not start communication, and does not shift to the device information acquisition processing.

In this embodiment, the example of using the camera of the mobile terminal 103 and the QR code has been described as an arrangement of acquiring the identifier for discriminating whether the image forming apparatus 101 operates in the special device information acquisition mode. The present invention, however, is not limited to this. For example, a method of acquiring the identifier using a short-distance wireless communication technique such as infrared communication, Bluetooth®, or NFC may be used. For example, an arrangement in which the image forming apparatus 101 stores a QR code in an NFC memory may be adopted.

Second Embodiment

In the second embodiment, the difference from the first embodiment will be described. In the first embodiment, when operating the image forming apparatus 101 in the device information acquisition mode, shutdown processing is executed in this step. This is done to cause the image forming apparatus 101 to operate as the Wi-Fi communication access point and operate as the special access point that enables only communication with the mobile terminal 103 and disables communication with other terminals. Since the operation as the special access point undergoes communication control exceptional for a normal operation, this may cause an unexpected failure in a communication environment or user settings. To avoid this, the image forming apparatus 101 is shut down once, and processing is performed by separating the activation sequence from the normal sequence of the image forming apparatus 101.

However, as long as a mobile terminal 103 and an image forming apparatus 101 can perform peer-to-peer communication, processing according to this embodiment is possible. Thus, the image forming apparatus 101 may operate as a Wi-Fi Direct host instead of a Wi-Fi communication access point.

Therefore, in this embodiment, an arrangement that adopts the Wi-Fi Direct technique when the image forming apparatus 101 and the mobile terminal 103 communicate with each other will be described. This eliminates the need to execute shutdown processing to shift to the device information acquisition mode or the normal mode, thereby simplifying a procedure.

<Procedure of Processing of Shifting to Device Information Acquisition Mode of Image Forming Apparatus>

Figure 17:
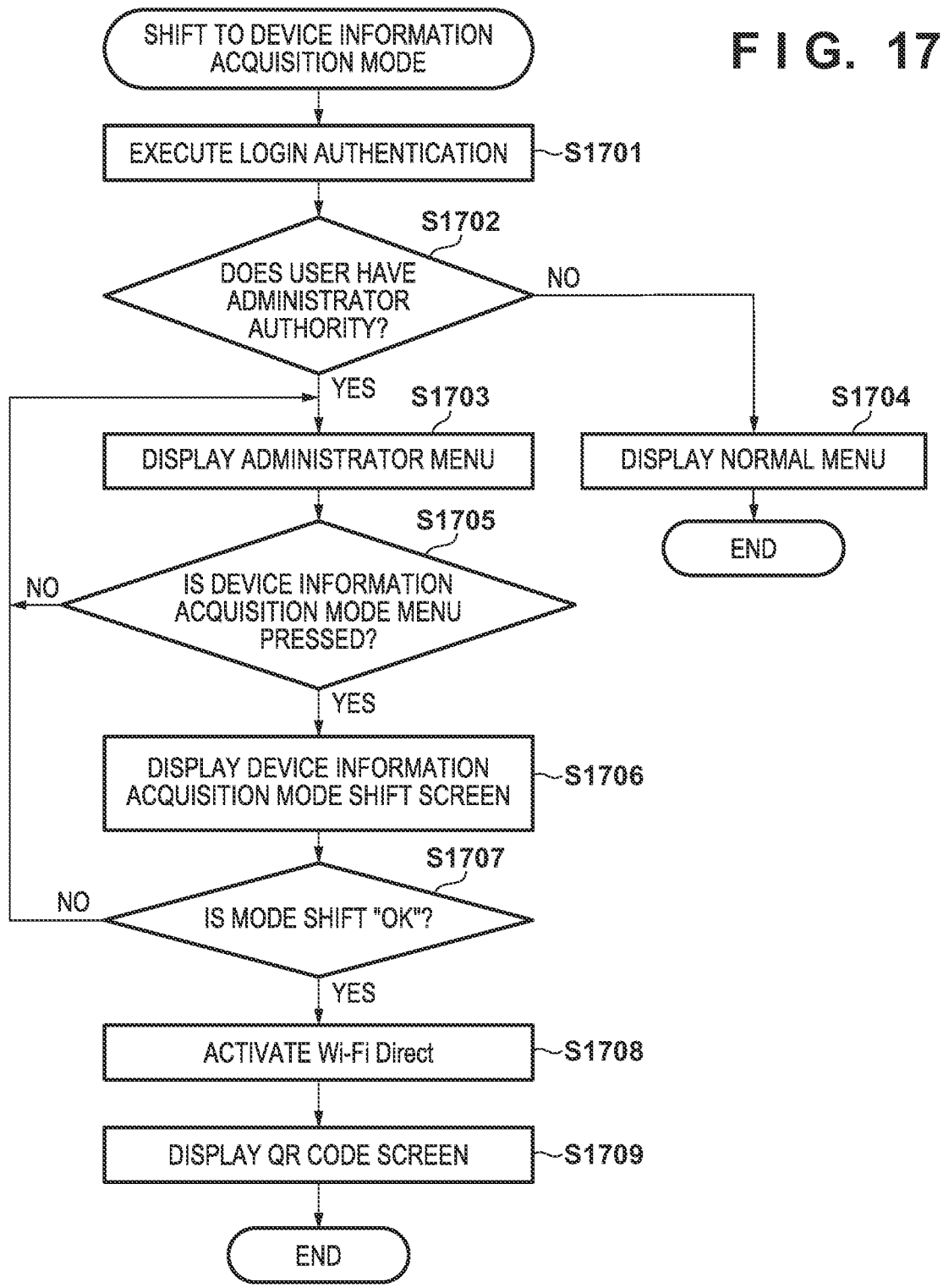
FIG. 17 is a flowchart illustrating processing of shifting to the device information acquisition mode in an image forming apparatus.

Processing of shifting to the device information acquisition mode of the image forming apparatus 101 will be described next with reference to FIG. 17. FIG. 17 is a flowchart almost the same as that shown in FIG. 11. Steps S1701 to S1707 in this procedure are the same as steps S1101 to S1107 of FIG. 11 and a description thereof will be omitted.

The difference from the first embodiment is that Wi-Fi Direct is adopted for communication between the mobile terminal 103 and the image forming apparatus 101. Although the image forming apparatus 101 operates as the special access point of Wi-Fi communication in step S1109 of FIG. 11, control is performed to cause the image forming apparatus 101 to operate as a Wi-Fi Direct host in step S1708 of FIG. 17. By adopting Wi-Fi Direct, the shutdown processing of the image forming apparatus 101 becomes unnecessary, and thus the shutdown processing in step S1108 of FIG. 11 is not performed in this procedure. Device ID information capable of identifying the image forming apparatus 101 as a Wi-Fi Direct host is included in a QR code displayed in step S1709 in addition to a mode identifier indicating that the image forming apparatus 101 operates in the device information acquisition mode, similar to the first embodiment. In this embodiment, the image forming apparatus 101 does not operate as an access point, and thus information of an SSID and passkey is not included in the QR code.

<Procedure of Device Information Acquisition Processing of Mobile Terminal>

Figure 18:
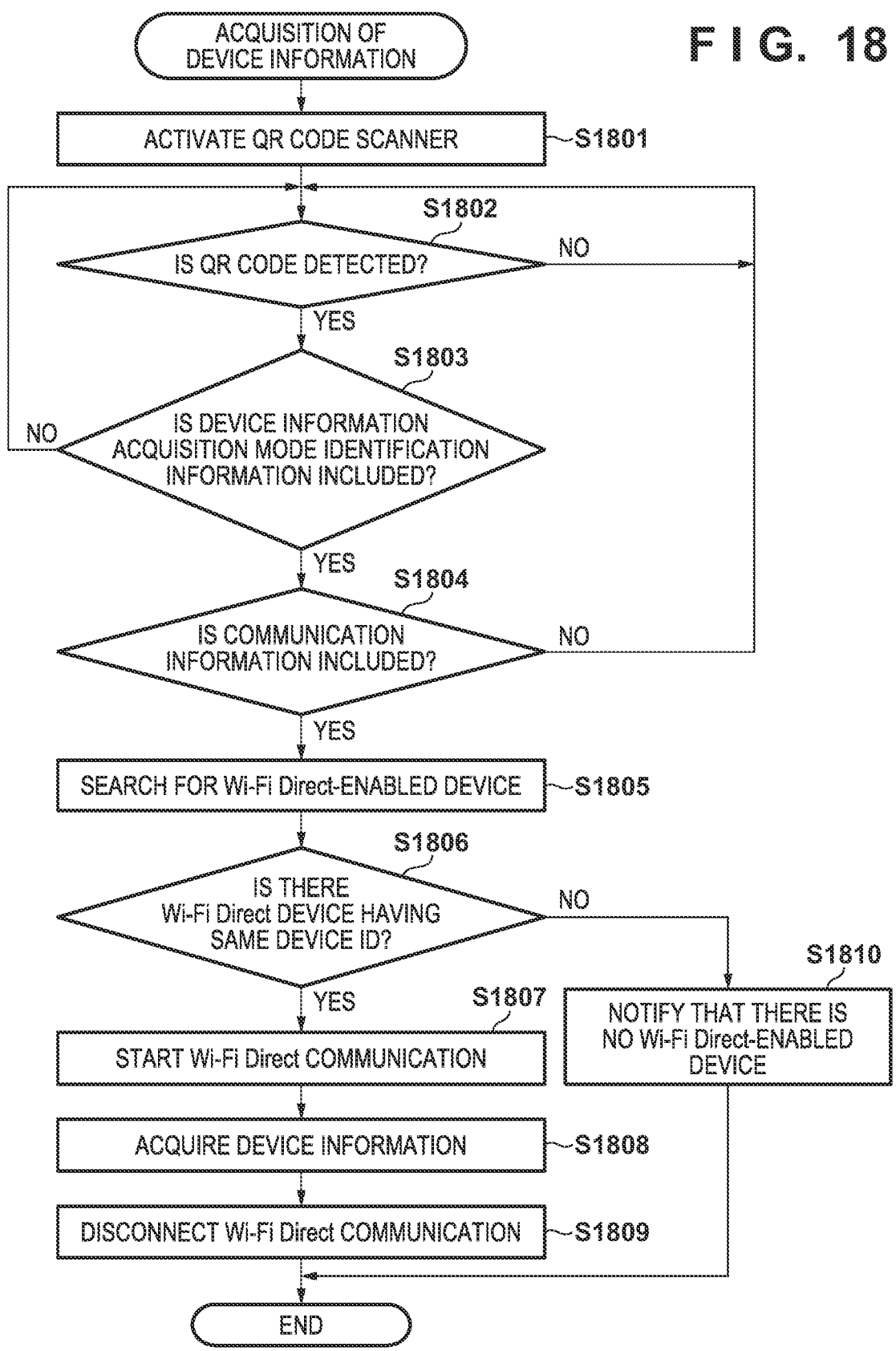
FIG. 18 is a flowchart illustrating device information acquisition processing in a mobile terminal.

The device information acquisition processing of the mobile terminal 103 will be described next with reference to FIG. 18. FIG. 18 is a flowchart almost the same as that shown in FIG. 12. Steps S1801 to S1804 and S1808 in this procedure are the same as steps S1201 to S1204 and S1207 of FIG. 12 and a description thereof will be omitted.

In step S1805, a central processing unit 401 starts to search the periphery of the mobile terminal 103 for the image forming apparatus 101 that can perform Wi-Fi Direct communication. In step S1806, the central processing unit 401 determines whether there exists the image forming apparatus 101 that can perform Wi-Fi Direct communication in the periphery of the mobile terminal 103. For example, this determination processing is performed based on whether there is a Wi-Fi Direct device having the same device ID. If such device exists, the process advances to step S1807; otherwise, the process advances to step S1810.

In step S1807, the central processing unit 401 starts Wi-Fi Direct communication with the image forming apparatus 101. In step S1809, the central processing unit 401 disconnects the Wi-Fi Direct communication from the image forming apparatus 101.

In step S1810, the central processing unit 401 displays, on an operation unit 406, information indicating that no image forming apparatus 101 that can perform Wi-Fi Direct communication exists in the periphery of the mobile terminal 103.

With the above processing, the device information acquisition processing of the mobile terminal 103 is executed.

<Procedure of Processing of Shifting to Normal Mode of Image Forming Apparatus>

Figure 19:
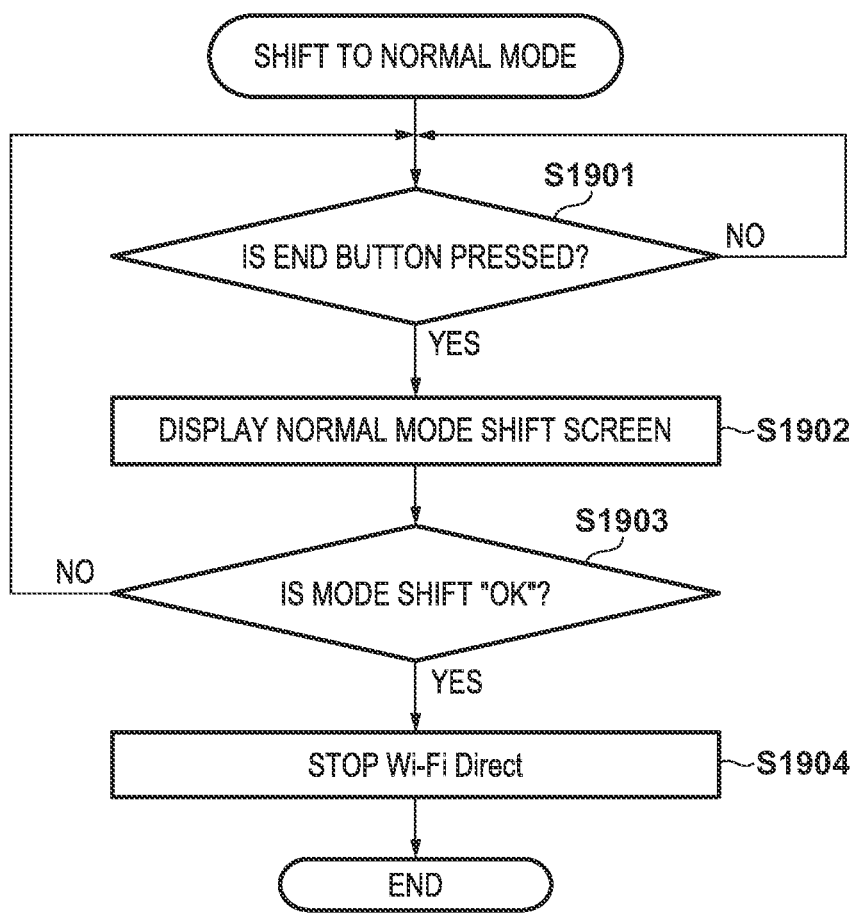
FIG. 19 is a flowchart illustrating processing of shifting to the normal mode in the image forming apparatus.

Processing of shifting to the normal mode of the image forming apparatus 101 will be described next with reference to FIG. 19. FIG. 19 is a flowchart almost the same as that shown in FIG. 14. Steps S1901 to S1903 in this procedure are the same as steps S1401 to S1403 of FIG. 14 and a description thereof will be omitted.

Figure 14:
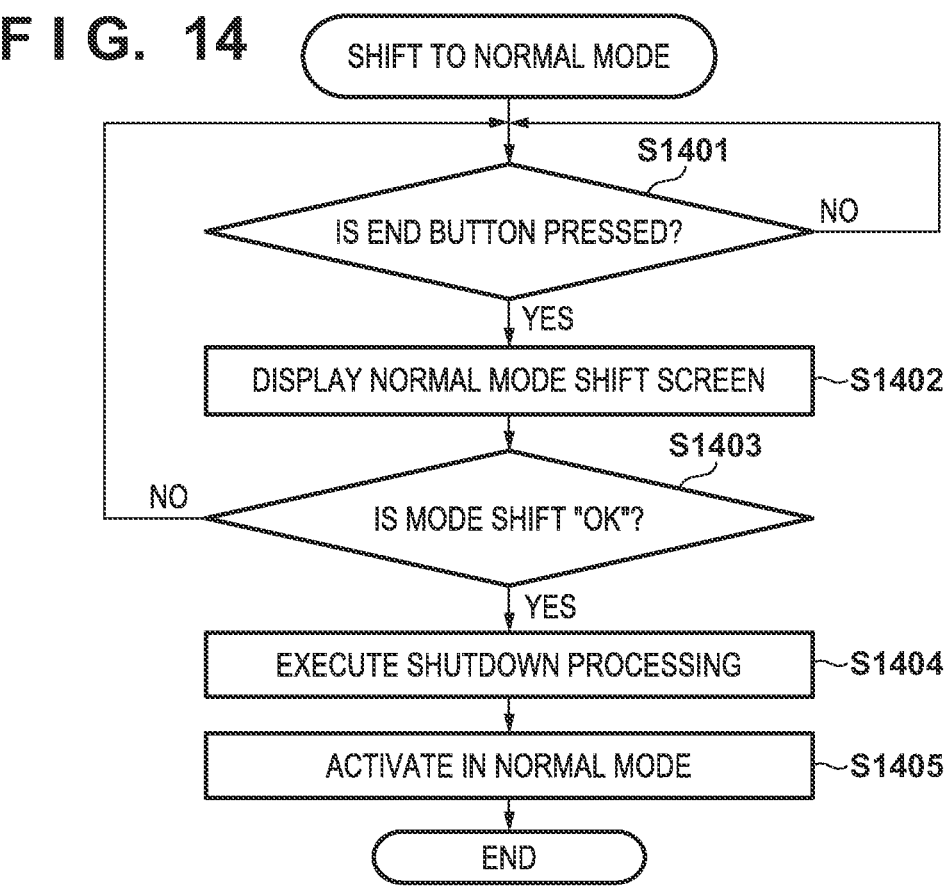
FIG. 14 is a flowchart illustrating processing of shifting to a normal mode in the image forming apparatus.

In this embodiment, since Wi-Fi Direct is adopted, the shutdown processing of the image forming apparatus 101 is unnecessary in this procedure, and thus the shutdown processing in step S1404 of FIG. 14 is not performed. In step S1904, a central processing unit 201 stops communication as the Wi-Fi Direct host.

With the above processing, the processing of shifting to the normal mode of the image forming apparatus 101 is executed.

As described above, according to this embodiment, by adopting Wi-Fi Direct for communication between the image forming apparatus 101 and the mobile terminal 103, it becomes unnecessary to execute the shutdown processing for a mode shift, thereby simplifying the processing.

Third Embodiment

In the third embodiment, the difference from the first and second embodiments will be described. In the first and second embodiments, simple processing imposes a communication restriction between the apparatuses. The mobile terminal 103 imposes a communication restriction such that if the mode identifier indicating that the image forming apparatus 101 is in the device information acquisition mode can be acquired from the QR code in step S1203 of FIG. 12, the mobile terminal 103 starts communication with the image forming apparatus 101, and if the mode identifier indicating that the image forming apparatus 101 is in the device information acquisition mode cannot be acquired from the QR code, the mobile terminal 103 performs no communication with the image forming apparatus 101.

The image forming apparatus 101 imposes, based on only whether the communication partner is the mobile terminal 103, a communication restriction such that if the self apparatus operates in the device information acquisition mode, only communication with the mobile terminal 103 is enabled, and communication with other terminals is disabled.

Considering implementation of a maintenance service of higher security, when transmitting/receiving the device information between the apparatuses, it is desirable to generate dedicated authentication information, execute authentication processing using the authentication information, and then exchange data.

Therefore, in this embodiment, when device information is transmitted/received between an image forming apparatus 101 and a mobile terminal 103 and when the device information is transmitted/received between a server 102 and the mobile terminal 103, these apparatuses generate common authentication information or different pieces of authentication information. Then, the authentication processing is executed using the authentication information, and only if authentication succeeds, the device information is transmitted/received. Thus, it is possible to implement a maintenance service of higher security.

<Procedure of Device Information Acquisition Processing of Mobile Terminal>

Figure 20:
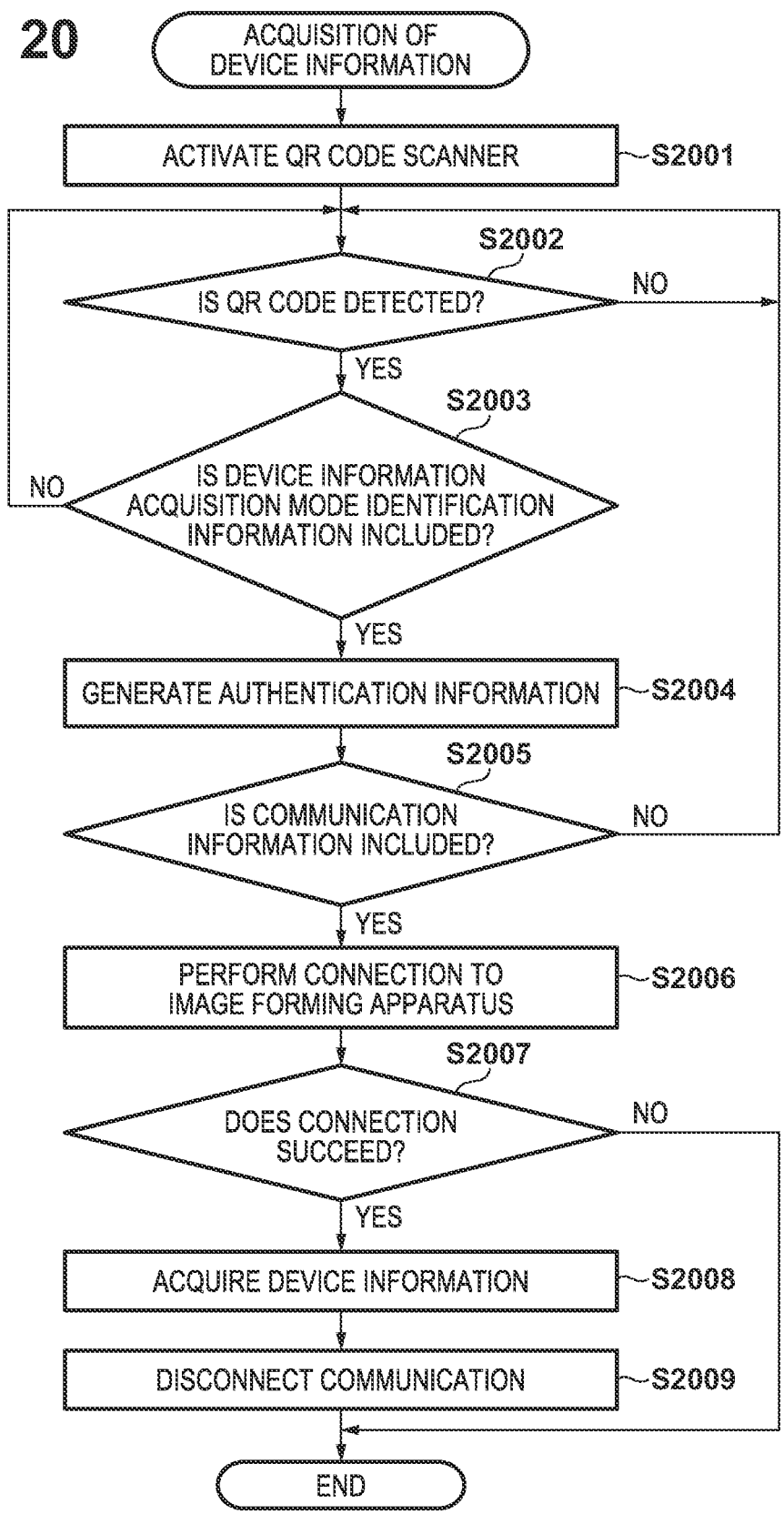
FIG. 20 is a flowchart illustrating device information acquisition processing in a mobile terminal.

The device information acquisition processing of the mobile terminal 103 will be described next with reference to FIG. 20. FIG. 20 is a flowchart almost the same as that shown in FIG. 12. Steps S2001 to S2003 and steps S2005 to S2009 in this procedure are the same as steps S1201 to S1203 and steps S1204 to S1208 of FIG. 12, respectively, and a description thereof will be omitted. In this embodiment, step S2004 is added.

In step S2004, based on information acquired from a QR code, a central processing unit 401 generates authentication information usable in authentication processing performed when acquiring the device information by communicating with the image forming apparatus 101. The authentication information may be used to generate an authentication key by assigning a predetermined hash to the information acquired from the QR code. However, the authentication information is not limited to this, and any data usable as the authentication information is possible.

With the above processing, the device information acquisition processing of the mobile terminal 103 is executed.

<Procedure of Device Information Transmission Processing of Image Forming Apparatus>

Figure 21:
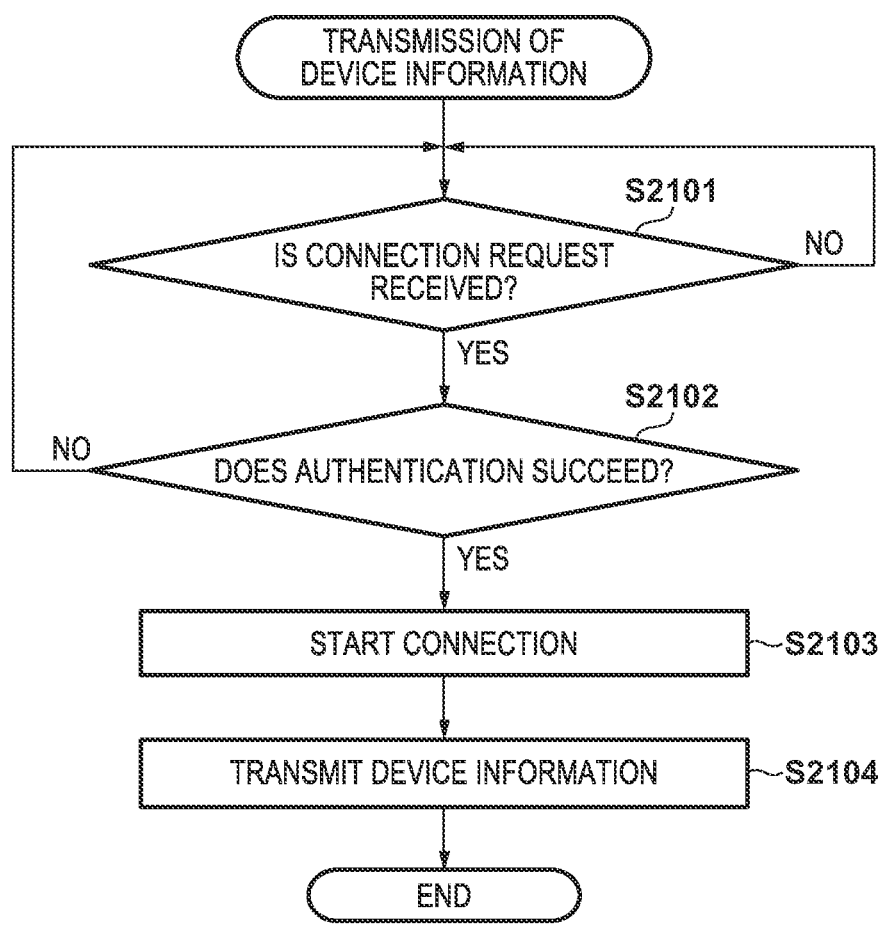
FIG. 21 is a flowchart illustrating device information transmission processing in an image forming apparatus.

The device information transmission processing of the image forming apparatus 101 will be described next with reference to FIG. 21. FIG. 21 is a flowchart almost the same as that shown in FIG. 13. Step S1201 and steps S2103 and S2104 in this procedure are the same as step S1301 and steps S1302 and S1303 of FIG. 13, respectively, and a description thereof will be omitted. In this embodiment, step S2102 is added.

In step S2102, a central processing unit 201 receives the authentication information from the mobile terminal 103, and determines whether authentication succeeds. If authentication succeeds, the process advances to step S2103; otherwise, the process returns to step S2101 to wait again for a connection request from the mobile terminal 103.

With the above processing, the device information transmission processing of the image forming apparatus 101 is executed.

<Procedure of Device Information Transmission Processing of Mobile Terminal>

Figure 22:
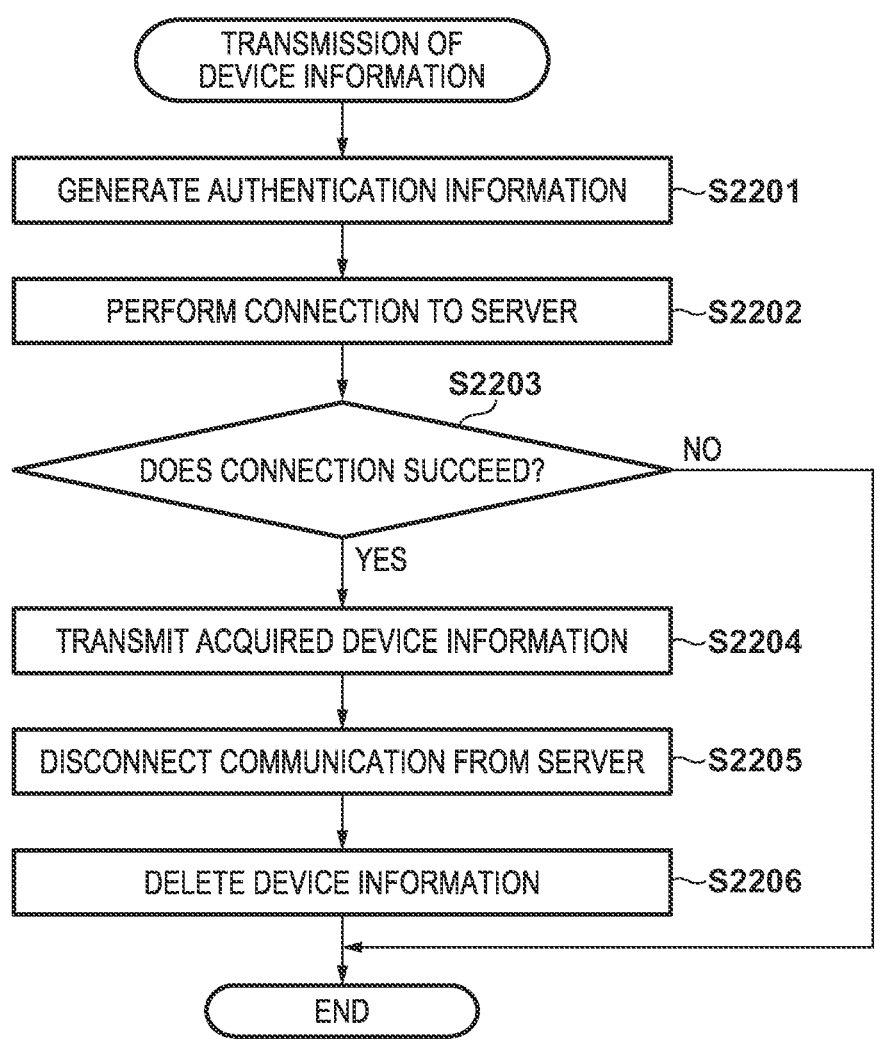
FIG. 22 is a flowchart illustrating device information transmission processing in the mobile terminal.

The device information transmission processing of the mobile terminal 103 will be described next with reference to FIG. 22. FIG. 22 is a flowchart almost the same as that shown in FIG. 15. Steps S2202 to S2206 in this procedure are the same as steps S1501 to S1505 of FIG. 15 and a description thereof will be omitted. In this embodiment, step S2201 is added.

In step S2201, the central processing unit 401 generates authentication information usable in authentication processing performed when transmitting the device information to the server 102. The authentication information may be used to generate an authentication key by assigning a predetermined hash to application identifier information held in advance in the device information acquisition application. By holding in advance the application identifier information in the server 102 or acquiring the application identifier information via a network 104, the information can be used as the authentication information. The authentication information is not limited to this, and any data usable as the authentication information is possible. The authentication information used for authentication between the image forming apparatus 101 and the mobile terminal 103 may be used or authentication information may be generated based on a completely different authentication key.

With the above processing, the device information transmission processing of the mobile terminal 103 is executed.

<Procedure of Device Information Reception Processing of Server Apparatus>

The device information reception processing of the server 102 will be described next with reference to FIG. 23. FIG. 23 is a flowchart almost the same as that shown in FIG. 16. Steps S2301 to S2303 and step S2305 in this procedure are the same as steps S1601 to S1603 and step S1604 of FIG. 16, respectively, and a description thereof will be omitted. In this embodiment, step S2304 is added.

In step S2304, a central processing unit 301 receives the authentication information transmitted from the mobile terminal 103, and determines whether authentication succeeds. If authentication succeeds, the process advances to step S2305; otherwise, the process ends.

With the above processing, the device information reception processing of the server 102 is executed.

As described above, according to this embodiment, when the device information is transmitted/received between the image forming apparatus 101 and the mobile terminal 103 and when the device information is transmitted/received between the server 102 and the mobile terminal 103, these apparatuses generate common authentication information or different pieces of authentication information. Then, the authentication processing is executed using the authentication information, and only if authentication succeeds, the device information is transmitted/received, thereby making it possible to implement a maintenance service of higher security.

In the first to third embodiments, the server 102 performs the maintenance service in which the device information is analyzed. The present invention, however, is not limited to this. The function of the server 102 may be provided in the image forming apparatus 101. Note that the device information described in each embodiment is assumed to include all or some of a job history, an error log, a service call log, an internal processing analysis log, and a consumable item log. However, the present invention is not limited to this. Any internal information of the image forming apparatus 101 usable for maintenance of the image forming apparatus 101 can be processed as device information in each embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060739, filed Mar. 27, 2018, which is hereby incorporated by reference herein in its entirety.

What is claimed is:

1. An image forming apparatus connectable to a network via an access point of an external apparatus, comprising:
    a wireless LAN interface configured to perform wireless communication;
    a display device configured to display information; and
    at least one controller configured to function as:
        a unit configured to execute restriction processing for restricting communication with the network;
        a unit configured to output specific information for establishing a connection relationship with a mobile terminal using the wireless LAN interface without intervention of the access point of the external apparatus;
        a unit configured to establish the connection relationship;
        a unit configured to transmit device information of the image forming apparatus to the mobile terminal via the connection relationship; and
        a unit configured to display, on the display device, a screen for starting establishment of the connection relationship in a state in which the restriction processing is executed,
    wherein the restriction processing includes processing of reactivating the image forming apparatus.

2. The apparatus according to claim 1, wherein
    the image forming apparatus further includes a wireless communicator,
    the screen is a screen for prompting a user to perform a close proximity operation between the mobile terminal and the image forming apparatus in order to start communication using the wireless communicator, and
    the specific information, to be outputted via the wireless communicator, includes at least a Service Set Identifier (SSID) and information indicating that the device information can be obtained.

3. The apparatus according to claim 2, wherein the wireless communicator can perform wireless communication using at least one of NFC and Bluetooth.

4. The apparatus according to claim 1, wherein the screen is a screen including a two-dimensional barcode, and
    the specific information, to be outputted as the two-dimensional barcode, includes at least a Service Set Identifier (SSID) and information indicating that the device information can be obtained.

5. A system comprising an image forming apparatus connectable to a network via an access point of an external apparatus, and a mobile terminal,
    the image forming apparatus comprising:
        a wireless LAN interface configured to perform wireless communication;
        a display device configured to display information; and
        at least one controller configured to function as:
            a unit configured to execute restriction processing for restricting communication with the network;
            a unit configured to output specific information for establishing a connection relationship with a mobile terminal using the wireless LAN interface without intervention of the access point of the external apparatus;
            a unit configured to establish the connection relationship;
            a unit configured to transmit device information of the image forming apparatus to the mobile terminal via the connection relationship; and
            a unit configured to display, on the display device, a screen for starting establishment of the connection relationship in a state in which the restriction processing is executed,
    wherein the restriction processing includes processing of reactivating the image forming apparatus.

6. The system according to claim 5, wherein
    the image forming apparatus further includes a wireless communicator,
    the screen is a screen for prompting a user to perform a close proximity operation between the mobile terminal and the image forming apparatus in order to start communication using the wireless communicator, and
    the specific information, to be outputted via the wireless communicator, includes at least a Service Set Identifier (SSID) and information indicating that the device information can be obtained.

7. The system according to claim 6, wherein the wireless communicator can perform wireless communication using at least one of NFC and Bluetooth.

8. The system according to claim 5, wherein the screen is a screen including a two-dimensional barcode, and
    the specific information, to be outputted as the two-dimensional barcode, includes at least a Service Set Identifier (SSID) and information indicating that the device information can be obtained.

9. A method executed in an image forming apparatus connectable to a network via an access point of an external apparatus, comprising:
    displaying, on a display device, a screen for starting establishment of a connection relationship in a state in which restriction processing is executed;
    executing restriction processing for restricting communication with the network;
    outputting specific information for establishing the connection relationship with a mobile terminal using a wireless LAN interface capable of performing wireless communication without intervention of the access point of the external apparatus;
    establishing the connection relationship; and
    transmitting device information of the image forming apparatus to the mobile terminal via the connection relationship,
    wherein the restriction processing includes processing of reactivating the image forming apparatus.

10. The method according to claim 9, wherein
    the image forming apparatus further includes a wireless communicator,
    the screen is a screen for prompting a user to perform a close proximity operation between the mobile terminal and the image forming apparatus in order to start communication using the wireless communicator, and the specific information, to be outputted via the wireless communicator, includes at least a Service Set Identifier (SSID) and information indicating that the device information can be obtained.

11. The method according to claim 10, wherein the wireless communicator can perform wireless communication using at least one of NFC and Bluetooth.

12. The method according to claim 9, wherein the screen is a screen including a two-dimensional barcode, and
the specific information, to be outputted as the two-dimensional barcode, includes at least a Service Set Identifier (SSID) and information indicating that the device information can be obtained.

13. A non-transitory computer-readable storage medium storing a program for causing a computer to operate to:
display, on a display device, a screen for starting establishment of a connection relationship in a state in which restriction processing is executed;
execute restriction processing for restricting communication with the network;
output specific information for establishing the connection relationship with a mobile terminal using a wireless LAN interface capable of performing wireless communication without intervention of the access point of the external apparatus;
establish the connection relationship; and
transmit device information of the image forming apparatus to the mobile terminal via the connection relationship,
wherein the restriction processing includes processing of reactivating the image forming apparatus.

14. The storage medium according to claim 13, wherein the screen is a screen for prompting a user to perform a close proximity operation with the mobile terminal in order to start communication using a wireless communicator, and
the specific information, to be outputted via the wireless communicator, includes at least a Service Set Identifier (SSID) and information indicating that the device information can be obtained.

15. The storage medium according to claim 14, wherein the wireless communicator can perform wireless communication using at least one of NFC and Bluetooth.

16. The storage medium according to claim 13, wherein the screen is a screen including a two-dimensional barcode, and
the specific information, to be outputted as the two-dimensional barcode, includes at least a Service Set Identifier (SSID) and information indicating that the device information can be obtained.

* * * * *